(12) United States Patent
Volpe

(10) Patent No.: US 11,442,890 B1
(45) Date of Patent: Sep. 13, 2022

(54) ON-CIRCUIT DATA ACTIVITY MONITORING FOR A SYSTOLIC ARRAY

(71) Applicant: Amazon Technologies, Inc., Seattle, WA (US)

(72) Inventor: Thomas A Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/091,979

(22) Filed: Nov. 6, 2020

(51) Int. Cl.
| | |
|---|---|
| *G06F 15/80* | (2006.01) |
| *G06F 9/30* | (2018.01) |
| *G06F 11/34* | (2006.01) |
| *G06F 15/78* | (2006.01) |
| *G06N 20/00* | (2019.01) |
| *G06F 13/366* | (2006.01) |
| *G06F 15/76* | (2006.01) |

(52) U.S. Cl.
CPC ...... *G06F 15/8046* (2013.01); *G06F 9/30101* (2013.01); *G06F 11/34* (2013.01); *G06F 11/3466* (2013.01); *G06F 13/366* (2013.01); *G06F 15/7807* (2013.01); *G06N 20/00* (2019.01); *G06F 2015/763* (2013.01)

(58) Field of Classification Search
CPC ... G06F 11/34; G06F 11/3466; G06F 15/8046
See application file for complete search history.

(56) References Cited

U.S. PATENT DOCUMENTS

| | | |
|---|---|---|
| 5,564,015 A | 10/1996 | Bunnell |
| 7,069,372 B1 * | 6/2006 | Leung, Jr. ............. G06F 9/3802 709/238 |
| 7,596,638 B2 | 9/2009 | Lee |
| 8,190,931 B2 | 5/2012 | Laurenti et al. |
| 8,949,650 B2 | 2/2015 | Nakamura et al. |
| 9,798,375 B1 | 10/2017 | Becker |
| 10,320,813 B1 | 6/2019 | Ahmed et al. |
| 10,401,235 B2 | 9/2019 | Coutts |
| 10,534,928 B1 | 1/2020 | Roden |
| 10,715,448 B2 | 7/2020 | Dey |
| 11,048,323 B2 | 6/2021 | Ho |
| 2005/0283561 A1 | 12/2005 | Lee |
| 2007/0081516 A1 | 4/2007 | Arimilli |
| 2007/0191993 A1 | 8/2007 | Wyatt |

(Continued)

FOREIGN PATENT DOCUMENTS

| | | |
|---|---|---|
| CN | 112232521 | 1/2021 |
| DE | 122017008096 T5 | 7/2020 |
| WO | 2019118016 | 6/2019 |

OTHER PUBLICATIONS

U.S. Appl. No. 17/091,853, filed Nov. 6, 2020, Ron Diamant, et al.

(Continued)

*Primary Examiner* — Jacob Petranek
(74) *Attorney, Agent, or Firm* — Robert C. Kowert; Kowert, Hood, Munyon, Rankin & Goetzel, P.C.

(57) ABSTRACT

On-circuit data activity monitoring may be performed for a systolic array. A current data activity measurement may be determined for changes in input data for processing at a systolic array and compared with a prior data activity measurement. Based on the comparison, a throttling recommendation may be provided to a management component to determine whether to perform the throttling recommendation.

20 Claims, 20 Drawing Sheets

(56) References Cited

U.S. PATENT DOCUMENTS

| | | |
|---|---|---|
| 2008/0072079 A1 | 3/2008 | Bieswanger |
| 2008/0250415 A1 | 10/2008 | Illikkal |
| 2009/0319759 A1 | 12/2009 | Rothman |
| 2010/0073068 A1 | 3/2010 | Cho |
| 2011/0191603 A1 | 8/2011 | Cher |
| 2011/0301777 A1 | 12/2011 | Cox |
| 2012/0297232 A1 | 11/2012 | Bircher |
| 2015/0261270 A1* | 9/2015 | Vikinski .............. G06F 9/3836 713/300 |
| 2015/0370303 A1 | 12/2015 | Krishnaswamy |
| 2017/0074729 A1 | 3/2017 | Coutts |
| 2017/0330267 A1 | 11/2017 | Cahall, Jr. |
| 2018/0314671 A1 | 11/2018 | Zhang et al. |
| 2019/0041942 A1 | 2/2019 | Keceli et al. |
| 2019/0042979 A1 | 2/2019 | Devulapalli |
| 2019/0179647 A1 | 6/2019 | Deka |
| 2019/0274101 A1 | 9/2019 | Price |
| 2019/0363988 A1 | 11/2019 | Dey |
| 2020/0057962 A1 | 2/2020 | Price |
| 2020/0341533 A1 | 10/2020 | Ho |
| 2021/0157651 A1* | 5/2021 | Duluk, Jr. ............ G06F 9/45533 |
| 2021/0200860 A1* | 7/2021 | Gendler ................ G06F 9/3802 |
| 2021/0286419 A1 | 9/2021 | Gan |
| 2021/0341988 A1 | 11/2021 | Chung |

OTHER PUBLICATIONS

U.S. Appl. No. 17/091,961, filed Nov. 6, 2020, Thomas A. Volpe, et al.
U.S. Appl. No. 17/091,964, filed Nov. 6, 2020, Ron Diamant, et al.
Albert Reuther, et al., "Survey of Machine Learning Accelerators," Sep. 2020, IEEE High Performance Extreme Computing (HPEC) Conference (Year: 2020), pp. 1-12.

* cited by examiner

ON-CIRCUIT DATA ACTIVITY MONITORING FOR A SYSTOLIC ARRAY

BACKGROUND

Integrated circuits provide a hardware solution for various processing tasks that is performant and efficient. Increasing numbers of processing tasks are offloaded from a host central processing unit (CPU) to integrated circuits to take advantage of these benefits. For example, the increasing popularity of including machine learning in various different applications, such as computer vision, speech recognition, machine translation, among others, has increased the use of integrated circuits that implement systolic arrays to perform processing tasks for machine learning. Systolic arrays offer a highly performant solution to execute large numbers of operations, such as multiply and accumulate, in parallel, increasing the speed of applications like machine learning that utilize such large numbers of operations.

Figure 1A:
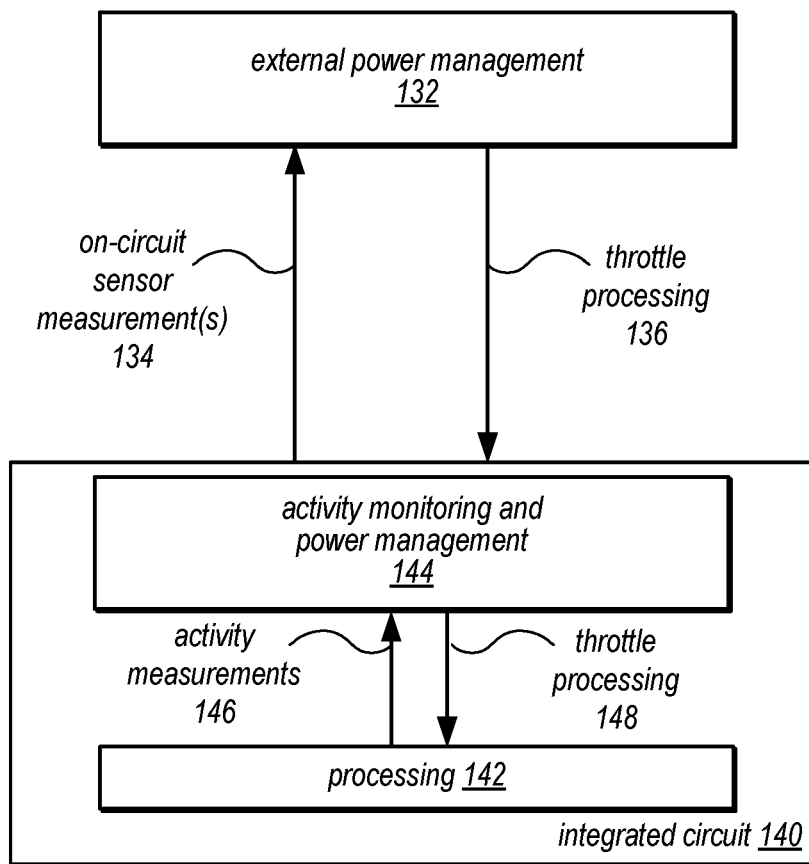
FIG. 1A illustrates a logical block diagram of on-circuit activity monitoring for modifying integrated circuit processing, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue.

"Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various techniques of on-circuit activity monitoring for integrated circuit processing are described herein. In various embodiments, power use of integrated circuits to perform various processing operations may be controlled to prevent problematic conditions, such as the various examples of problematic power conditions discussed below. Throttling techniques which control the rate of processing (e.g., by controlling the rate at which data is provided for processing) may be implemented in order to change the amount of power used by an integrated circuit, in some embodiments. Some problematic power conditions, however, can occur quickly. In order to protect against these problematic power conditions, on-circuit activity monitoring for integrated circuit processing may be implemented in order to determine when to perform throttling, in some embodiments.

Some types of processing may be particularly susceptible to problematic power conditions. Machine learning, for instance, may involve performing a large number of operations (e.g., for neural network calculations) in parallel. As the number of these operations could change quickly over time, the power usage to perform these operations could also change quickly. Moreover, machine learning is also an example of processing where it is difficult for control systems to determine a workload that may be caused based on requests to perform machine learning tasks. Instead, the nature of input data, including the patterns or other changes to input data over time, may further exacerbate power demands to complete processing operations. Malicious actors, for instance, could cause problematic power conditions via power viruses or other modifications to input data patterns, thereby exceeding the capacity of processing resources to perform requested tasks.

Various problematic power conditions can occur. For example, one problematic power condition may be a temporary peaking of current (e.g., a current rate of change (di/dt) event). Temporary peaking of current could be unsustainable for integrated circuit decoupling capacitors (e.g., on-chip, on-package, and on-board). Another example problematic power condition may be continuous current due to very high sustained activity that a voltage regulator cannot sustain. Another example problematic power condition may be for high, long-term activity that causes a junction temperature to approach levels where a thermal system cannot cool a device implementing the integrated circuit. In various embodiments, on-circuit activity monitoring for integrated circuit processing may be implemented to prevent problematic power conditions, like those discussed above, as on-circuit activity monitoring may be able to quickly detect and respond to workloads that lead to problematic power conditions. In this way machine learning processing or other types of susceptible processing can implement hardware-based defenses and mitigation techniques to reduce or eliminate the occurrence of problematic power conditions.

Different techniques for managing power usage may be implemented in various embodiments. FIG. 1A illustrates a logical block diagram of on-circuit activity monitoring for modifying integrated circuit processing, according to some embodiments. External power management 132 may be implemented to control power usage of integrated circuit 140. External power management 132 may be a microcontroller executing firmware on a same device (e.g., board or card) implementing integrated circuit 140, an application or component of a host system (e.g., system 2000 in FIG. 20), or any other external component for performing power management implemented external to integrated circuit 140 (e.g., off-chip). Integrated circuit 140 may be an application specific integrated circuit (ASIC), field programmable gate array (FPGA), system-on-a-chip (SoC), or any other dedicated circuitry that performs processing 142 for various tasks (e.g., training and/or inference tasks for machine learning models using a systolic array as discussed below with regard to FIGS. 2-10).

Various sensors implemented on integrated circuit 140 (not illustrated) may be used to collect information about integrated circuit 140, such as current demand and/or temperature. Although not illustrated, other sensors implemented external to integrated circuit 140 may also provide sensor measurements that may affect decisions to throttle processing at integrated circuit 140. Power management 132 may obtain the on-circuit sensor measurements 134 to make power management decisions to prevent or correct problematic power conditions by requesting throttling of processing 142, as indicated at 136. Communications between power management 112 and integrated circuit 120 may be over an interconnect (e.g., AXI), single wire, and/or general-purpose input/output (GPIO) in order to receive on-circuit sensor measurements 134 and/or return throttle processing 136 instructions.

Additionally, as illustrated in FIG. 1A, integrated circuit 140 may implement activity monitoring and power management 144, in various embodiments. Activity monitoring and power management 144 may capture, collect, or otherwise determine activity measurements from processing 142 performed at integrated circuit 140, in some embodiments, and then instruct throttling processing 148.

As noted above, both power management 132 and activity monitoring and power management 148 may direct throttle processing in some scenarios. For example, power management 132 may detect throttling events based on current demand or temperature information (e.g., above a threshold) and then instruct throttle processing 136 in order to reduce current demand or temperature. In some embodiments, activity monitoring and power management 144 may detect throttling events based on data activity or processing utilization, as discussed below with regard to FIGS. 3-10, and then instruct throttle processing 148 to reduce data activity or utilization.

Some problematic power conditions can occur quickly. For example, temporary peaking (noted earlier) can occur on the order of 100s of nanoseconds or microseconds. Some applications, such as a systolic array implemented on an integrated circuit as discussed below can quickly increase utilization (and thus power) in very short time (e.g., in approximately 60 nanoseconds utilization can increase from 0% to 100%). To address these, and other problematic power conditions that quickly occur, on-circuit activity monitoring can detect and response to workloads quickly. For instance, compare integrated circuit throttling timeline 150 with external throttling timeline 160. A same throttling event could occur at a same time, 152 and 162 respectively. For integrated circuit throttling, the detection 154 may occur significantly before detection externally, as indicated at 164. Similarly, throttling to prevent a problematic power condition can begin significantly earlier, as indicated 156, by activity monitoring and power management 144, than can power management 132, as indicated at 166. For time sensitive problematic power conditions, on-circuit activity monitoring and power management 144 can provide preventative throttling detection and throttling performance (e.g., in a few nanoseconds) whereas external power management 132 may be take longer to detect and respond (e.g., in a few milliseconds), and thus may be too slow to prevent some problematic power conditions from occurring.

This specification begins with general descriptions of an integrated circuit that is a machine learning accelerator device, which may implement a systolic array to perform machine learning operations and an activity monitor for the systolic array to modify systolic array processing. Various examples of different components/modules, or arrangements of components/modules that may be implemented in or along with the activity monitor may then be discussed. A number of different methods and techniques to implement on-circuit activity monitoring for integrated circuit processing are then discussed, some of which are illustrated in an accompanying flowchart. Various examples are provided throughout the specification.

Figure 2:
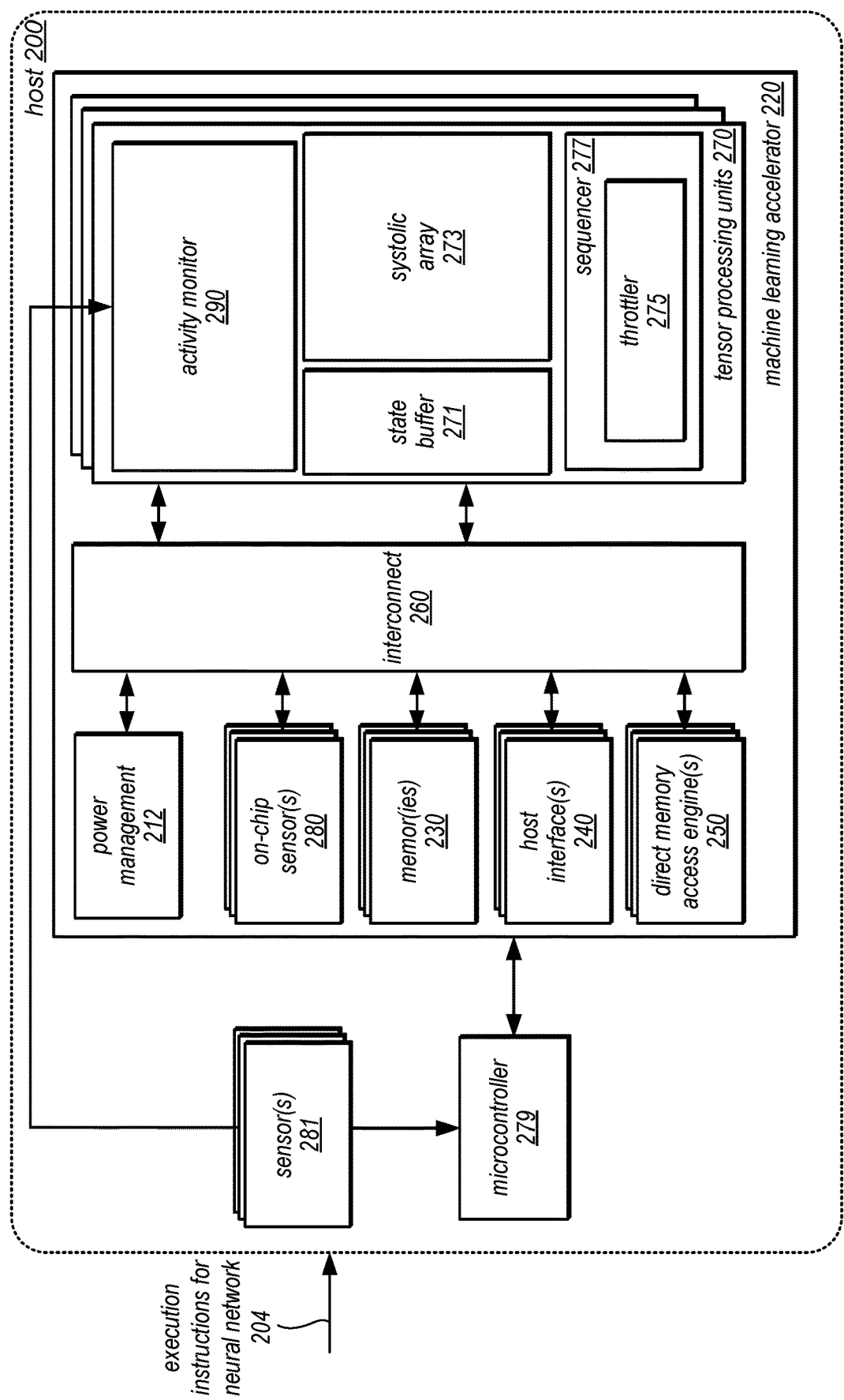
FIG. 2 is a logical block diagram illustrating a host that handles instructions to a machine learning accelerator with on-circuit activity monitoring for modifying machine learning accelerator processing, according to some embodiments.

FIG. 2 is a logical block diagram illustrating a host that handles instructions to a machine learning accelerator with on-circuit activity monitoring for modifying machine learning accelerator processing, according to some embodiments. Host 200 may be a computing system, like computing system 2000 discussed below with regard to FIG. 20 or other computing platform that may implement machine learning accelerator 220 to support and/or perform various machine learning tasks. For example, a neural network compiler may receive a neural network and generate execution instructions 204 to execute the neural network on processing units, such as tensor processing units 270 implemented as part of machine learning accelerator 220. Host 200 may implement an interface (not illustrated) via which instructions for the neural network 204 may be received (e.g., a command or instruction that triggers an upload protocol or file transfer for the neural network). In some embodiments host 200 may be implemented as part of a network-based service that offers client applications the capability to create, train, upload and/or execute neural networks on service computing resources which may be selected based on their hardware and/or software capabilities to support different types of neural network applications (e.g., image recognition, speech recognition, sentiment recognition, prediction, etc.). In some embodiments (not illustrated) a neural network compiler may be implemented on a same host as machine learning accelerator 220 and the execution instructions may be provided 204 may be provided over internal communications paths (e.g., a bus or other interconnect). In some embodiments, execution instructions 204 may be received over a network connection between two hosts to allow machine learning accelerator 220 to load and execute the neural network.

Machine learning accelerator 220 (or portions thereof, such as individual tensor processing units 270) may be implemented as an integrated circuit, such as an application specific integrated circuit (ASIC), field programmable gate array (FPGA), system-on-a-chip (SoC), or other dedicated circuitry. Machine learning accelerator 220 may implement host interface(s) 240 to receive instructions and weights to execute a neural network. For example, host interface(s) 240 may include Peripheral Component Interconnect Express (PCIe) interface that can receive the instructions 204 and load them to memor(ies) 230. Similarly, host interface(s) 240 may support various communications for managing the performance of machine learning accelerator 220. For example, power management may be implemented as part of host 200 on a microcontroller 279 executing management firmware as part of a circuit board on which machine learning inference accelerator 220 is mounted that may receive various sensor measurements from sensors 281 (e.g., temperature or other environmental conditions) to determine conditions or scenarios in which throttling instructions may be sent (e.g., by writing software-based throttling recommendations as discussed below). In some embodiments, a host processor (not illustrated), such as a CPU, may also send or otherwise signal throttling recommendations.

Figure 20:
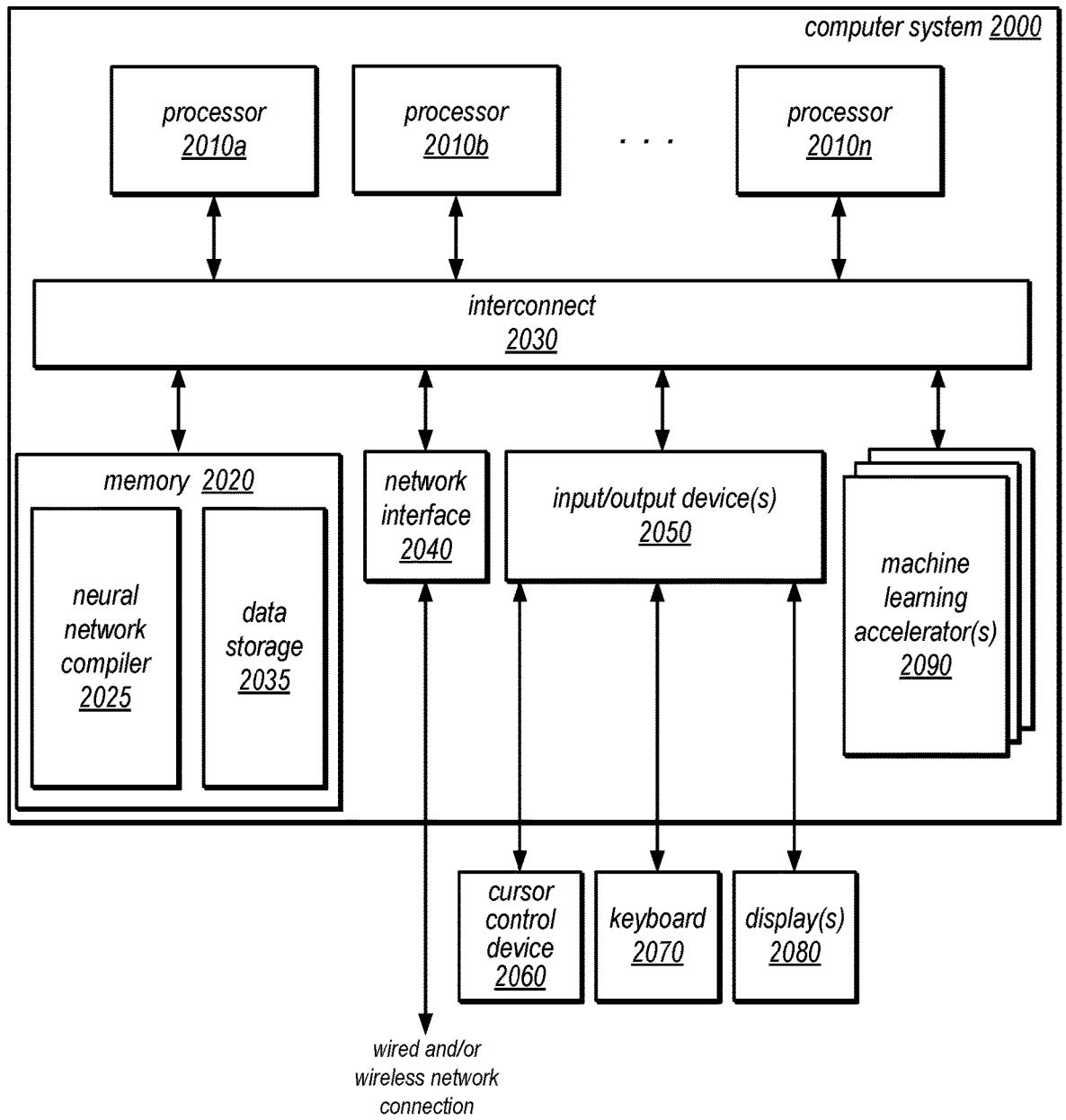
FIG. 20 is an example computer system, according to some embodiments.

In some embodiments, machine learning accelerator 220 may implement memor(ies) 230, such as Dynamic Random Access Memory (DRAM), high bandwidth memory, or other memory technologies, such as memory 2020 discussed below with regard to FIG. 20. Memor(ies) 230 may store instructions, weights and other data for performing training and/or inferencing on a neural network (e.g., the input data for evaluation, such as input images for image recognition). In some embodiments, machine learning accelerator 220 may implement interconnect 260 to support communication amongst machine learning accelerator 220 components (e.g., host interface(s) 240, memor(ies) 230, direct memory access engine(s) 250, and tensor processing units 270. Interconnect 260 may implement one of many different kinds of bus architectures, such as an AXI fabric. In some embodiments, machine learning accelerator 220 may implement direct memory access (DMA) engine(s) 250. Direct memory access engine(s) 250 may support actions by tensor processing units 270 to, for instance, read, write, load, store, or otherwise access memor(ies) 230 to execute a neural network.

In some embodiments, machine learning accelerator 220 may implement tensor processing units 270 to perform various calculations in order to execute a neural network. Tensor processing units 270 may implement sequencer 277 which may obtain and decode the execution instructions 204 for the operations assigned to the tensor processing unit from memor(ies) 230. Sequencer 277 may use direct memory accessing engine(s) 250 to loads the weights and other information into state buffer 271 (which may be an on-chip memory, such as SRAM that acts as a dedicated cache for an individual tensor processing unit 270). As discussed below in detail with regard to FIGS. 3 and 4, sequencer 277 may implement throttler 275 which may perform throttling modify the rate at which data is input to systolic array via state buffer 271. In some embodiments, different tensor processing units may have different sizes of dedicated cache (and/or different sizes or shapes of a systolic array).

Tensor processing unit 270 may implement a systolic array 273 of processing elements which perform the operations of the neural network according to the weights in state buffer. Different systolic arrays may be differently shaped (e.g., longer horizontally than vertically, or vice versa, as well as square shaped), in some embodiments providing a different processing capacity. These processing elements may execute operations, such as multiply and accumulate operations and then pass input data and weights to other elements in the array 273 for further processing. After array calculations the data may be passed to other functional units (not illustrated). For instance, after the systolic array 273, the data may go through normalization and then activation, which is a non-linear sum of the partial products (e.g. tanh or reLU). Data, such as input feature maps, filters, and output features may be processed through systolic array 273. Results may loop back through state buffer 271 for additional processing or pass through additional calculations at the output of the systolic array 273.

Machine learning accelerator 220 may implement on-chip sensor(s) 280, in various embodiments. On-chip sensors may capture measurements related to voltage and temperature. Other sensors external to machine learning accelerator 220 may be implemented, such as sensor(s) 281, which may also capture measurements related to voltage and temperature, in some embodiments. For example, between the different sensor(s) 281 and 280, measurements related to voltage regulator power, voltage regulator temperature, mezzanine temperature, high bandwidth (HBM) memory temperature, SOC temperature, SOC voltage, may be captured, among other measurements.

Figure 3:
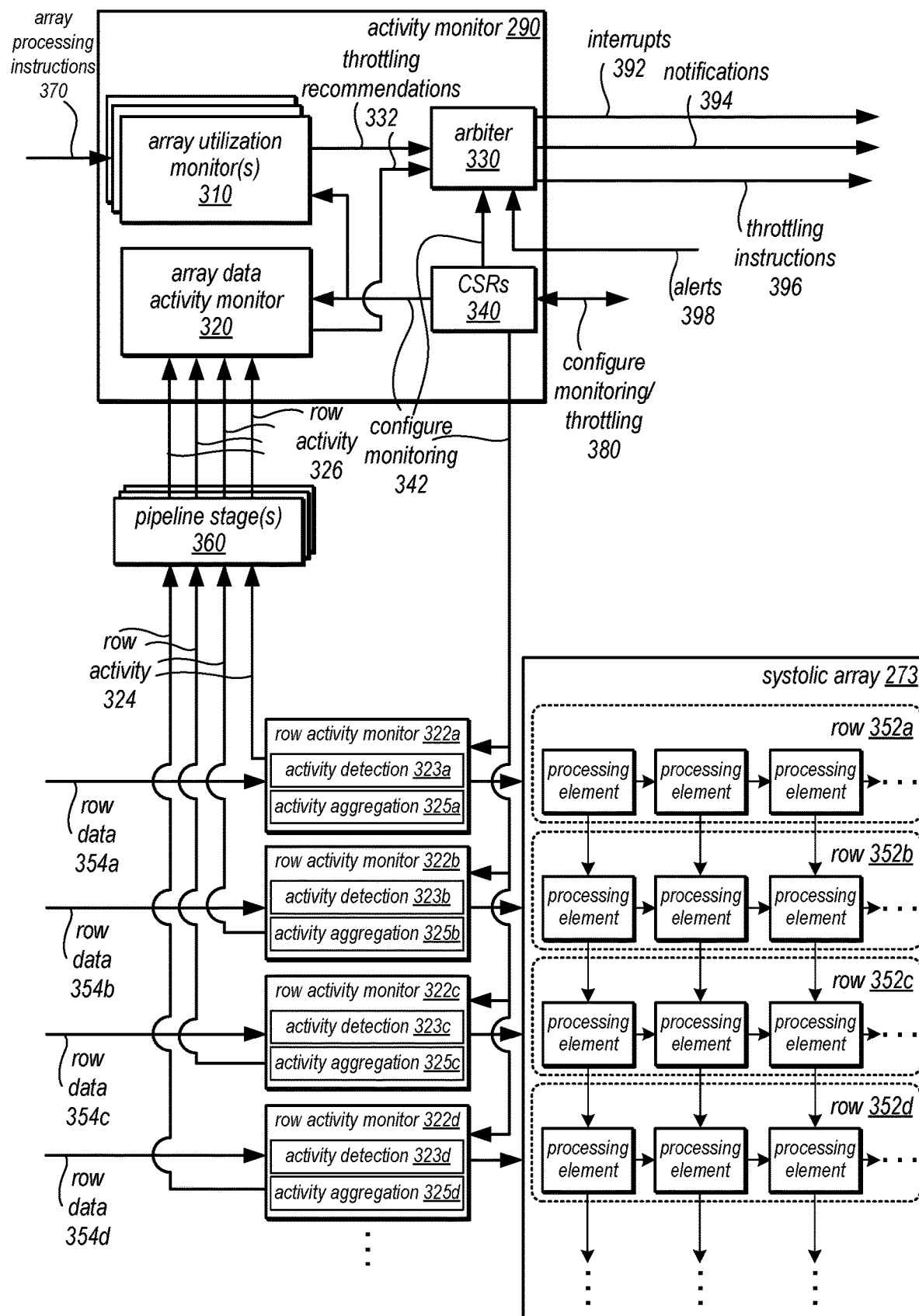
FIG. 3 is a logical block diagram illustrating an activity monitor for detecting changes in activity measurements to modify integrated circuit processing, according to some embodiments.

Tensor processing units 270 may implement activity monitor 290, in various embodiments, to provide on-chip monitoring and throttling in response to the activity on systolic array 273. FIG. 3 is a logical block diagram illustrating an activity monitor for detecting changes in activity measurements to modify integrated circuit processing, according to some embodiments. Activity monitor 290 may implement (and/or coordinate) one or multiple activity monitors around systolic array 273, in some embodiments, in order to measure various level of activity and make throttling recommendations based on the measure activity. For example, in some embodiments, the measure of activity may be measured over different time frames (e.g., short-term, medium-term, and long-term).

In some embodiments, different monitors may monitor different types of activity. For example, as illustrated in FIG. 3, activity monitor 290 may implement array utilization monitor(s) 310 to determine average array utilization over one or more time periods, in some embodiments. Utilization monitor(s) 310 may, based, on the measured array utilization (e.g., based on a current level of utilization and previously measured level utilization), determine throttling recommendations. For example, array processing instructions 370 may be used to determine the utilization of the array, in some embodiments. FIGS. 6 and 12-14, discussed below, provide further detail of various techniques and features that may be implemented as part of utilization monitor(s) 310.

In another example of a type of monitored activity, activity monitor 290 may implement array data activity monitor 320. In various embodiments, array data activity monitor 320 may detect x-direction bus data activity over a period of time (as high x-direction bus data activity over a period of time may make a large impact on the power dissipation). In some embodiments, array data activity monitor 320 may receive row-level data activity information from respective row activity monitors, such as row activity monitor 322a, 322b, 322c, 322d, and so on, that measure, based on row data input for processing through respective processing elements of different rows of systolic array 273 (e.g., such as row data 354a input to row 352a, row data 354b input to row 352b, row data 354c input to row 352c, and row data 354d input to row 352d), as discussed in detail with regard to FIGS. 7-9 using activity detection 323, respectively illustrated for each row as 323a, 323b, 323c, 323d, and activity aggregation 325, respectively illustrated for each row as 325a, 325b, 325c, 325d. In some embodiments, activity monitor 290 may be instanced near "Row 0" of systolic array 273 in order to capture instructions entering rows that are co-located with "Row 0," such as "Row 32," "Row 64," and "Row 96." In some embodiments, row activity monitors 322 may be instanced in systolic array 273 itself (though illustrated outside systolic array 273 in FIG. 3) as part of "PRE/TAG" logic, or may be implemented as a pipeline stage prior to systolic array 273 (e.g., as illustrated in FIG. 3). FIGS. 7-9 and 15-17, discussed below, provide further detail of various techniques and features that may be implemented as part of array data activity monitor(s) 320.

Pipeline stage(s) 360 may be implemented, in some embodiments, in order to ensure that the activity on all of the x-direction busses on all the rows for a single clock cycle can be considered (e.g., summed up) together. In some embodiments, the number of pipeline stage(s) 360 may be based on an amount of time that a signal from a row activity 324, measured from the most distant row, takes to reach array data activity monitor 320. In some embodiments, pipeline stage(s) 360 may not be implemented (as activity measurements for row data may be aggregated over a number of cycles). Pipeline stage(s) 360 may, however, provide a way to verify if the row activity 324 measurements provided represent the total number of data transitions on a same cycle (or types of data transitions on a same cycle as discussed below with regard to FIGS. 7-9).

In some embodiments, control status registers (CSRs) 340 may be implemented as part of activity monitor 290. CSRs 340 may support reads or writes performed as part of configuring the monitoring and throttling of activity monitor 290, in some embodiments, as indicated at 380, and discussed in detail below with regard to FIG. 5. Configuration information from CSRs 340 may be used to configure monitoring, as indicated at 342, at array utilization monitor(s) 310, array data activity monitor 320, row activity monitors 322, and at arbiter 330, in some embodiments.

In some embodiments, where multiple types of activity measurements and events to perform throttling recommended and/or triggered by these events may be implemented, activity monitor 290 may implement techniques to decide whether to and how much to throttle. In at least some embodiments, activity monitor 290 may implement arbiter 330 to make throttling decisions and request throttling via throttling instructions 396. For example, array utilization monitor(s) 310 and array data activity monitor(s) 320 may provide throttling recommendations 332 to arbiter 330 (e.g., different respective throttling percentages). Arbiter 330 may implement various selection schemes for selecting a throttling amount to instruct. For example, in some embodiments, arbiter 330 may select a strongest or highest amount of throttling recommended, as discussed in detail below with regard to FIGS. 10, 18, and 19. In at least some embodiments, arbiter may receive alerts 398 that may also indicate throttling events or recommendations directly from other hardware components, such as other sensors 280 or 281, as illustrated in FIG. 2. For example, one or more GPIO inputs may be used to signal alerts 398, such as active low and configured to operate as level inputs, (e.g., throttle when low, release throttle when high), or to operate as sticky (e.g., throttle when low and continue throttling until cleared (e.g., by a microcontroller or externally executing software) regardless of whether the GPI input goes high). Alerts 398 may be triggered by board-level conditions, such as a voltage regulator-over current warning, in some embodiments. External power management (e.g., microcontroller 279 in FIG. 2) may be able to make throttling recommendations via CSRs 340 to provide software-based throttling recommendations handled by activity monitor 290, in some embodiments.

Arbiter 330 may support sending various interrupts 392 and/or notifications 394, in some embodiments. For example, interrupts 392 may be signaled or otherwise sent to various status or other registers, management components, such as a microcontroller, or other components that make take actions responsive to receiving the interrupt using interrupt handling techniques. For example, an interrupt 392 may be a hardware-based interrupt to the execution of management code on a microcontroller to cause the microcontroller to execute different portions of management code to address the scenario indicated by the interrupt. Notifications 394 may be sent, in some embodiments, in order to provide information (e.g., statistics about throttling, changes to throttling, etc.) which may (or may not) trigger further responsive actions. For example, a notification 394 may be software-based notification sent to a microcontroller, which may store or otherwise retain the notification information until management software on the microcontroller performs tasks to evaluate or check for notifications. As described in the various action tables illustrated below, different throttling recommendations may cause the sending of interrupts 392 and/or notifications 394.

Figure 4:
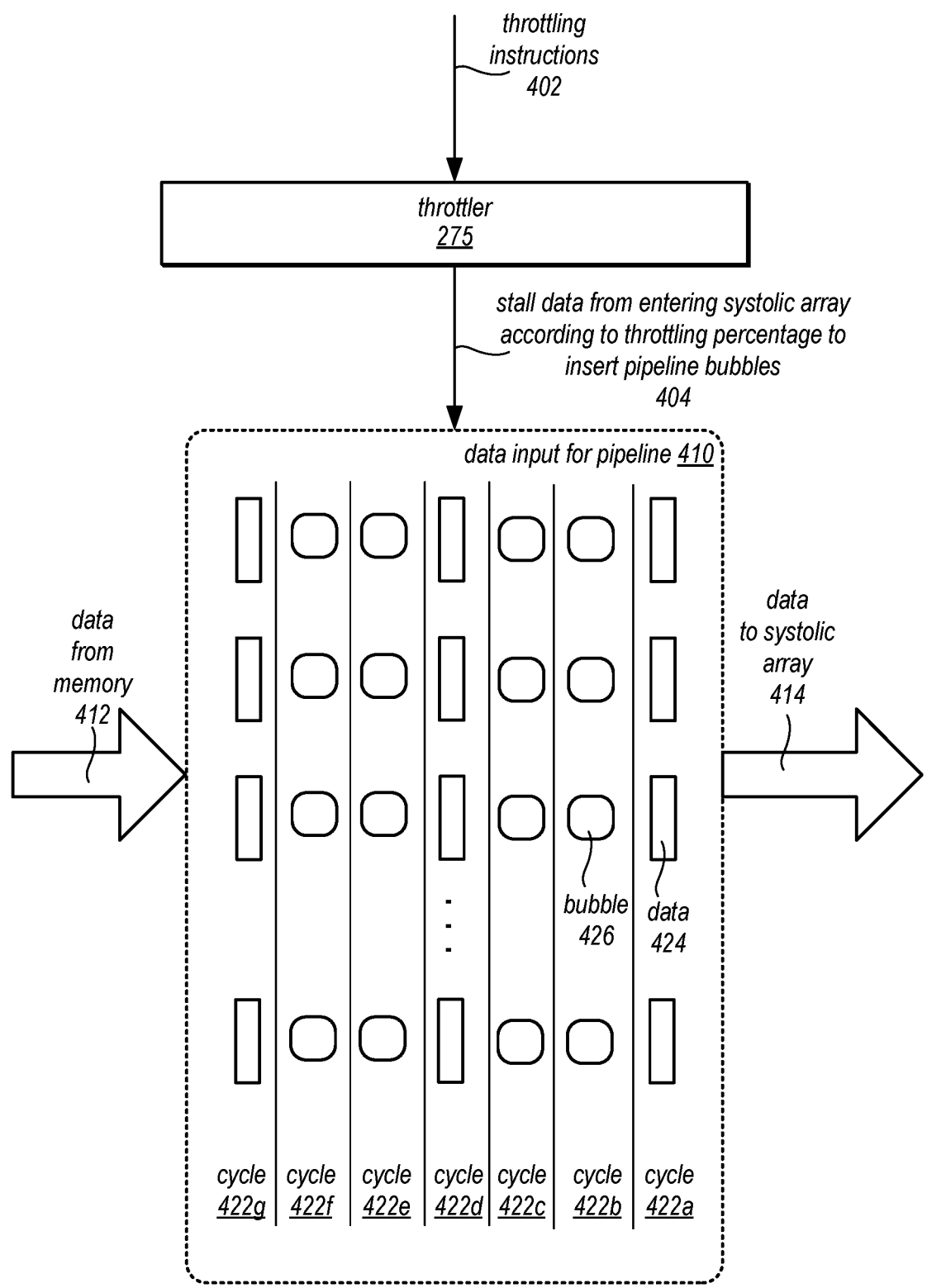
FIG. 4 is a logical block diagram illustrating a throttler for modifying integrated circuit processing, according to some embodiments.

As illustrated in FIG. 3, activity monitor 290 can send throttling instructions 396 (e.g., as determined by arbiter 330) to an interface for a throttler implemented for systolic array 273. FIG. 4 is a logical block diagram illustrating a throttler for modifying integrated circuit processing, according to some embodiments. Throttler 275 may implement an interface for accepting throttling instructions, like throttling instructions 402, which may be received from arbiter 330, in some embodiments. In some embodiments, throttler 275 may modify the rate at which data enters systolic array 273 in order to throttle processing at systolic array 273. For example, throttler 275 may, as indicated 404, stall data from entering the systolic array 273 according to a throttling percentage, specified in throttling instructions 402, in order to insert bubbles 426 into the processing pipeline for systolic array 273, in some embodiments.

In FIG. 4, it is shown that data obtained from memory 412 is input into the data pipeline, as indicated at 410 that is provided to systolic array 273, as indicated at 414. For some cycles, such as cycle 422*a*, 422*d*, and 422*g*, data (indicated by 424) for each row is obtained from memory 412 and provided 414 to systolic array 273. In this way, a throttling percentage (e.g., 30% or 1 of 3 cycles) is applied by throttler 275.

In some embodiments, a throttling percentage may be specified as part of throttling instructions 402. For example, throttler 275 may allow data to enter systolic array 273 for k cycles out of every n cycles. If there is no throttling applied, then data will be allowed to enter on every cycle (e.g., k=n). A throttling percentage of 50% may be specified, for instance, in different ways which, in turn, may result in different ways of throttling the same percentage. When throttling is specified as k=1, n=2, data will be enabled to enter the array for 1 cycle and then will be stalled for 1 cycle to create a bubble 426, and so on. When throttling is specified as k=50, n=100, also 50%, data will be enabled to enter the array for 50 cycles and then stalled for 50 cycles. As noted above in FIG. 2, as throttler 275 is implemented as part of sequencer 277, sequencer 277 may handle various edge cases or scenarios where a remaining amount of data is, for instance less than the specified 50 cycles.

Figure 5:
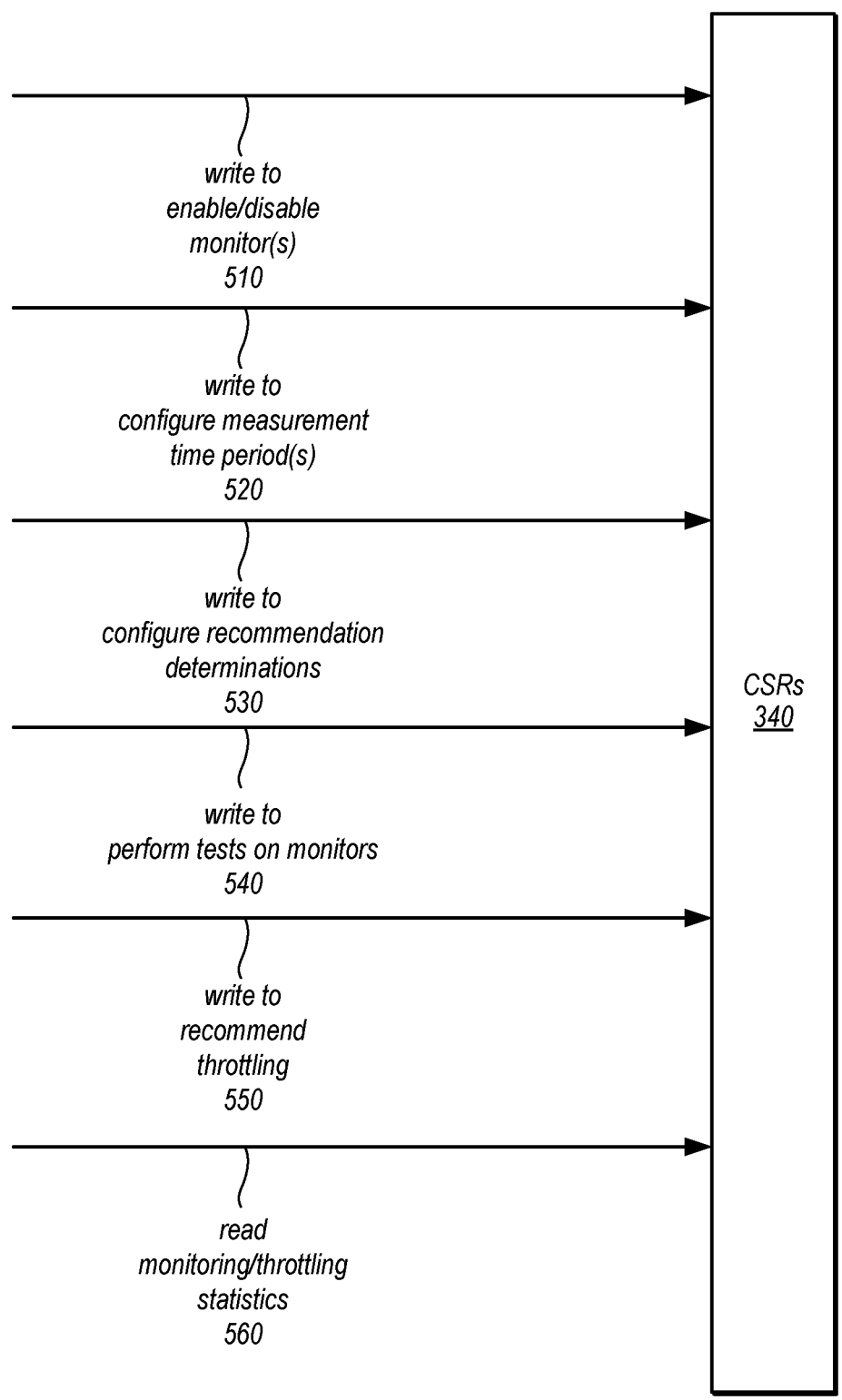
FIG. 5 is a logical block diagram illustrating interactions to configure activity monitoring, according to some embodiments.

As noted in FIG. 3, monitoring and throttling based on the monitoring can be configured by power management 212 or other components, in some embodiments, via CSRs 340. FIG. 5 is a logical block diagram illustrating interactions to configure activity monitoring, according to some embodiments. In some embodiments, CSRs 340 may be mapped into 4 KB space so that access can be blocked from the host system. Instead, utilization statistics can be shared with the host system in response to host requests using a host interface (or readless-read communication interface).

As indicated at 510, CSRs 340 may receive writes to enable or disable various monitors of activity monitor 290, in some embodiments. For example, one (or more, but not necessarily all) array utilization monitor(s) 310 could be enabled, and not array data activity monitor 320. In some scenarios, no monitors could be enabled, and in still other scenarios both types of monitors could be enabled.

As indicated at 520, CSRs 340 may receive writes to configure measurement time period(s), in some embodiments, for various monitors. For example, a length of period of time for array utilization or data activity may be specified in various units of measure for time (e.g., seconds, milliseconds, nanoseconds, and so on). Different monitors may collect and make throttling recommendations on the activity measured during the specified time period.

As indicated at 530, writes to configure recommendation determinations 530 may, in various embodiments, be received at CSRs 340. For example, monitors may utilize various thresholds or other conditions to determine when and how much to throttle (e.g., throttling percentages), in various embodiments. In at least some embodiments, one (or more) action tables may be used to map measurements to throttling recommendations (including no throttling). In those embodiments, writes to configure recommendation determinations 530 may cause corresponding changes in the action table(s).

As indicated at 540, CSRs 340 may receive writes to perform tests on monitors, in some embodiments. For example, writes may submit test values to be used in place of measurements to determine the behavior of monitors, arbiter, and/or throttling. As indicated at 550, CSRs 340 may receive writes to recommend throttling, in some embodiments. For example, power management 212 (or other component) may recommend throttling in response to various other conditions which are detected externally (e.g., off-chip). As indicated at 560, CSRs 340 may be read in order to obtain various monitoring and/or throttling statistics, in some embodiments. For example, statistics related to currently applied throttling, which monitor or other source's throttling recommendation was chosen, and how many times throttling has been applied because of a monitor (e.g., utilization or data activity), among other statistics or indicators of status.

Figure 6:
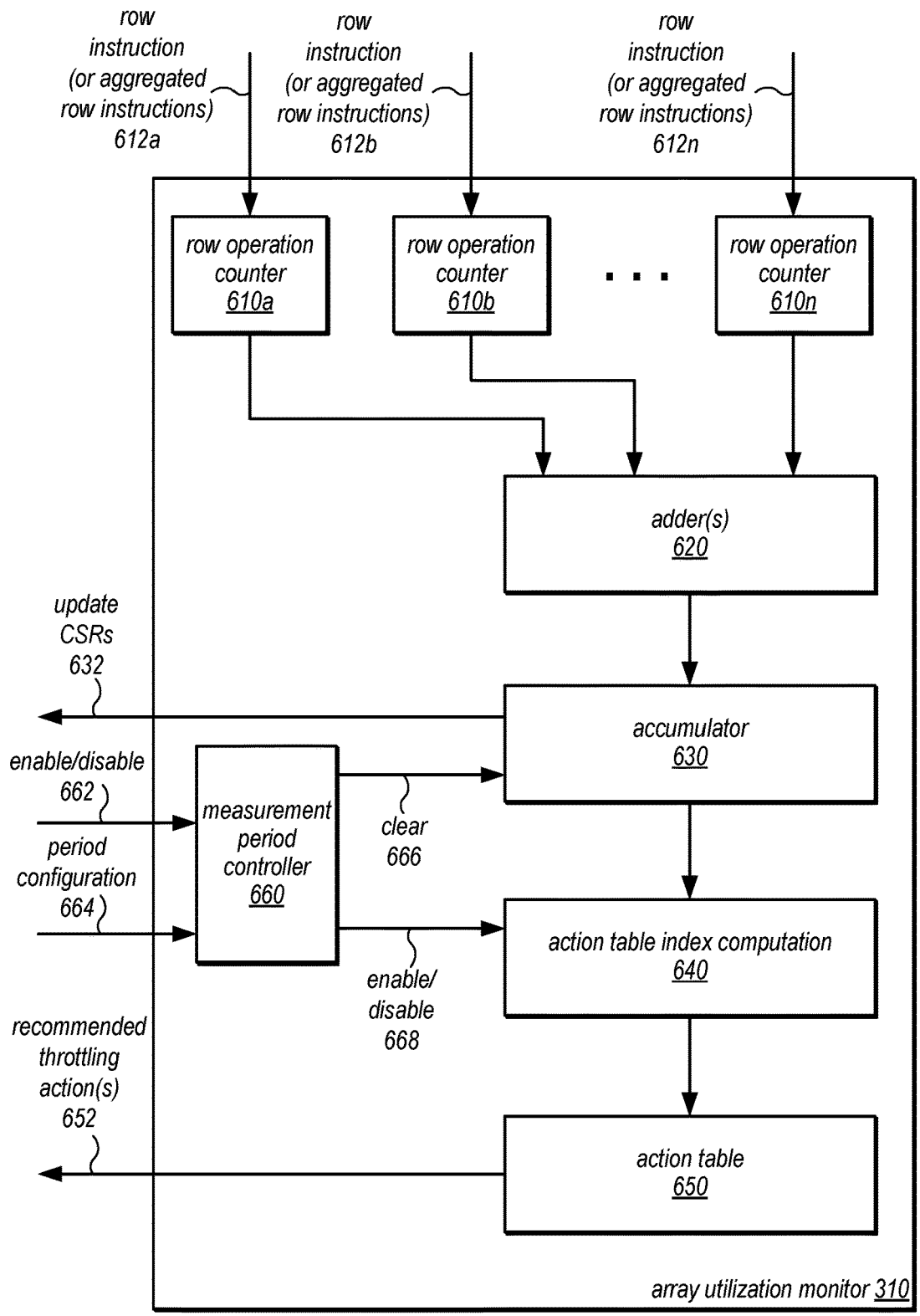
FIG. 6 is a logical block diagram illustrating an example utilization monitor, according to some embodiments.

As discussed above with regard to FIG. 3, one or multiple utilization monitors may be implemented as part of activity monitor 290. FIG. 6 is a logical block diagram illustrating an example utilization monitor, according to some embodiments. In various embodiments, a measurement of expected array utilization (without any throttling applied) may be determined according to an instruction for processing elements being executed as a wave of operations (e.g., matrix multiplies) start entering the systolic array. In this way, any throttling that is applied before matrix multiplies enter the systolic array may not affect the measurement of array utilization. The number of rows and columns in the systolic array may be known, so, in various embodiments, the array utilization may be may be measured as matrix multiplies enter the systolic array. For example, in FIG. 6, individual row instructions 612*a*, 612*b*, through 612*n* may be implemented to count at respective row counters 610*a*, 610*b*, through 610*n* a number of operations. One or more adders 620 may be used to combine the individual row counts into a single row count for a cycle to add to accumulator 630, in some embodiments.

In at least some embodiments, an array utilization measurement may indicate an actual or estimated number of processing elements active (e.g., performing an operation such as matrix multiply) on each cycle (or over a number of cycles in a time period). For example, in the case of neural network processing, if it is the case that ifmaps flow through all columns in a systolic array, the utilization measurement may be calculated according to the utilization of the first column of a tile (or the entire array) by counting matrix multiplies in the first column of each tile on each cycle. In other embodiments, all columns of processing elements may have utilization tracked (e.g., in scenarios where area, power, latency, or other design/performance considerations allow for additional logic to track all (or at least more) columns).

Array utilization may be determined in different ways. For example, in some embodiments, a numerical percentage may be calculated (e.g., X processing elements performing an operation out of Y total processing elements for a given cycle). In some embodiments, array utilization may be determined by adding a number of operations (e.g., matrix multiply operations) to an accumulator, such as accumulator 630, for every cycle when an operation enters the array based on the number of rows that will be utilized on that cycle so that a determination of usage for the processing elements in subsequent columns in the same row can be made (as the instructions entering a row may propagate to other processing elements in different columns in the same row). In some embodiments, array utilization may be a measurement over a period of time that is an average of individual cycle measurements. For instance, in the ifmap example given above, if ifmap data is staggered on different rows over the course of cycles when entering the systolic array, it may not be necessary to take the staggering into account (e.g., such as trying to count 4 rows on a first cycle, 8 rows on the second cycle, 12 rows on the third cycle, and so on) when determining the measurement. Instead, the array utilization can be based on matrix multiplies entering the first row and counting all rows that will be used for that wave, in some embodiments. In this way, array utilization monitor 310 may be able to determine current utilization of the systolic array independent of whether the systolic array is operating as a single tile or multiple tiles. As indicated at 632, a current accumulation (or an accumulation as the utilization measurement upon which a throttling recommendation is made) may be reported back by updating CSRs 340, as indicated at 632.

As noted above, in some embodiments, an average array utilization may be determined. To determine the average array utilization, an array utilization monitor may count the number of matrix multiplies that enter the array over the course of a measurement time period (e.g., specified as a number of cycles or as various units of time, which may be used to determine the number of cycles). Array utilization monitor 310 may implement measurement period controller 660 in order to implement a measurement time period. For example, configuration information (e.g., which may be obtained or programmed through CSRs 340) may allow for monitoring as a whole to be enabled or disabled, as indicated at 662, and a period of time to be set, as indicated at period configuration 664. Measurement controller 660 may clear accumulator 630 when a measurement period is complete and may enable or disable action table lookups to enable or disable recommending throttling action(s) 652. In at least some embodiments, the measurement period may be programmable and support measurement time periods on the order of seconds (e.g., a 33-bit counter to allow 233/2.8 GHz may equal 3 seconds), with cycle counts to be powers of 2. To give an example of counting matrix multiplies: if the average utilization is to be measured over a measurement time period of 1024 clocks (or 365 ns), then 100% utilization could be represented by 128 rows*1024 cycles=128K matrix multiply operations. If an instruction starts that will utilize 64 rows, then 64 matrix multiply operations can be added to the utilization accumulator on every cycle that data enters the array. In some embodiments, throttling may be considered as part of determining the array utilization. If, for example, throttler 275 is applying 50% throttling when this instruction executes, then 64 matrix multiply units will be added to the accumulator on 50% of the cycles in the measurement time period and the accumulator will total to 32K after 1024 cycles. So the average utilization for the measurement time period would be 32K/128K=25%. In some embodiments, other units of measure for time may be supported for programming the measurement time period.

In various embodiments, array utilization monitor 310 may utilize an action table, such as action table 650, to determine throttling recommendations and/or other actions based on the utilization measurements. In some embodiments, action table 650 can be programmed via CSRs 340, as discussed above with regard to FIG. 5. When active, array utilization monitor 310 may perform a lookup into action table 650 at the end of a measurement time period. As indicated at 640, an action table index computation may be performed in order to determine the corresponding entry in the action table to use for the throttling recommendation or other actions. In some embodiments, the index into the table may be broken into two fields. One field may be a single bit that indicates a comparison of whether the previously computed average utilization was higher or lower than the current average utilization (to indicate whether the utilization is increasing or decreasing to allow for hysteresis in the table), in some embodiments. For example, a utilization measurement for a prior period may be recorded, stored, or otherwise retained. A comparison of the current utilization measurement with the prior period may indicate whether the utilization measurement is an increase from the prior period (e.g., by taking a difference and to determine whether the difference value is positive or negative). If an increase exists, then the single bit may be set to "1" to indicate that utilization is increasing (e.g., as illustrated in the example action table below).

The second field of the index may be created from the current utilization accumulator total, as determined at 630. In some embodiments, the accumulator may be divided based on the number of entries in the Action Table and based on the Measurement Period to create the index used in the action table 650 lookup. For example, the maximum accumulator value for the 1024 cycle measurement time period may be 128K. If there are 8 entries in the action table 650, then the accumulator can be divided by 16K (e.g., by right shifting the accumulator by 16 bits). The number of bits to shift may depend on the number of entries in the action table 650, in some embodiments.

In some embodiments, action table 650 may include entries that contain k and n values and a numerical representation of the throttling percentage (k/n). In some embodiments, a power management component (e.g., a microcontroller executing firmware) may populate the table with these values (e.g., the hardware will not compute the numerical representation of k/n). In some embodiments, action table 650 may also include a flag to indicate when an interrupt should be generated and sent. In some embodiments, the numerical representation of k/n may be used to arbitrate between the throttling recommendations from multiple monitors (e.g., with the most severe/lowest throttling percentage winning) by arbiter 330. Then, the k and n values from the winning monitor may be used by throttler 275 to control the throttling.

Below is an example of an action table 650. Note that various other input columns and/or output columns may be included in other embodiments. For example, instead of a percentage range, a value determined by right shifting an accumulated operation total may be stored as current utilization.

TABLE 1

| ACTION TABLE INPUTS | | ACTION TABLE OUTPUTS | | | | |
|---|---|---|---|---|---|---|
| Utilization Increasing | Current Utilization | k | n | Throttling Percentage | Interrupt | Notification |
| 1 | 0.0% < u ≤ 12.5% | 10 | 10 | 100 | 0 | 0 |
| 1 | 12.5% < u ≤ 25.0% | 10 | 10 | 100 | 0 | 0 |
| 1 | 25.0% < u ≤ 37.5% | 10 | 10 | 100 | 0 | 0 |
| 1 | 37.5% < u ≤ 50.0% | 10 | 10 | 100 | 0 | 0 |
| 1 | 50.0% < u ≤ 62.5% | 10 | 10 | 100 | 0 | 0 |
| 1 | 62.5% < u ≤ 75.0% | 9 | 10 | 90 | 0 | 1 |
| 1 | 75.0% < u ≤ 87.5% | 3 | 4 | 75 | 1 | 0 |
| 1 | 87.5% < u ≤ 100.0% | 1 | 2 | 50 | 1 | 1 |
| 0 | 0.0% < u ≤ 12.5% | 10 | 10 | 100 | 0 | 0 |
| 0 | 12.5% < u ≤ 25.0% | 10 | 10 | 100 | 0 | 0 |
| 0 | 25.0% < u ≤ 37.5% | 10 | 10 | 100 | 0 | 0 |
| 0 | 37.5% < u ≤ 50.0% | 10 | 10 | 100 | 0 | 0 |
| 0 | 50.0% < u ≤ 62.5% | 10 | 10 | 100 | 0 | 1 |
| 0 | 62.5% < u ≤ 75.0% | 9 | 10 | 90 | 0 | 0 |
| 0 | 75.0% < u ≤ 87.5% | 3 | 4 | 75 | 0 | 0 |
| 0 | 87.5% < u ≤ 100.0% | 1 | 2 | 50 | 0 | 0 |

In embodiments, action table lookups may be determined based on the difference between a current utilization and a previous utilization to allow for a differential control, such as by determining the difference value (e.g., by subtraction) between the utilizations. In some embodiments, multiple action tables and/or multiple lookups may be implemented to determine multiple throttling recommendations for an array utilization measurement. In addition to throttling percentages, other actions, such as notifications or interrupts may be recommended and sent to an arbiter 330 (via other outbound interfaces, such as an interrupt signal and/or notification signal). In this way, further information can be provided to a power management component (e.g., as indicated in the example table that interrupts are triggered at "high" levels of throttling by the "1" value).

Figure 7:
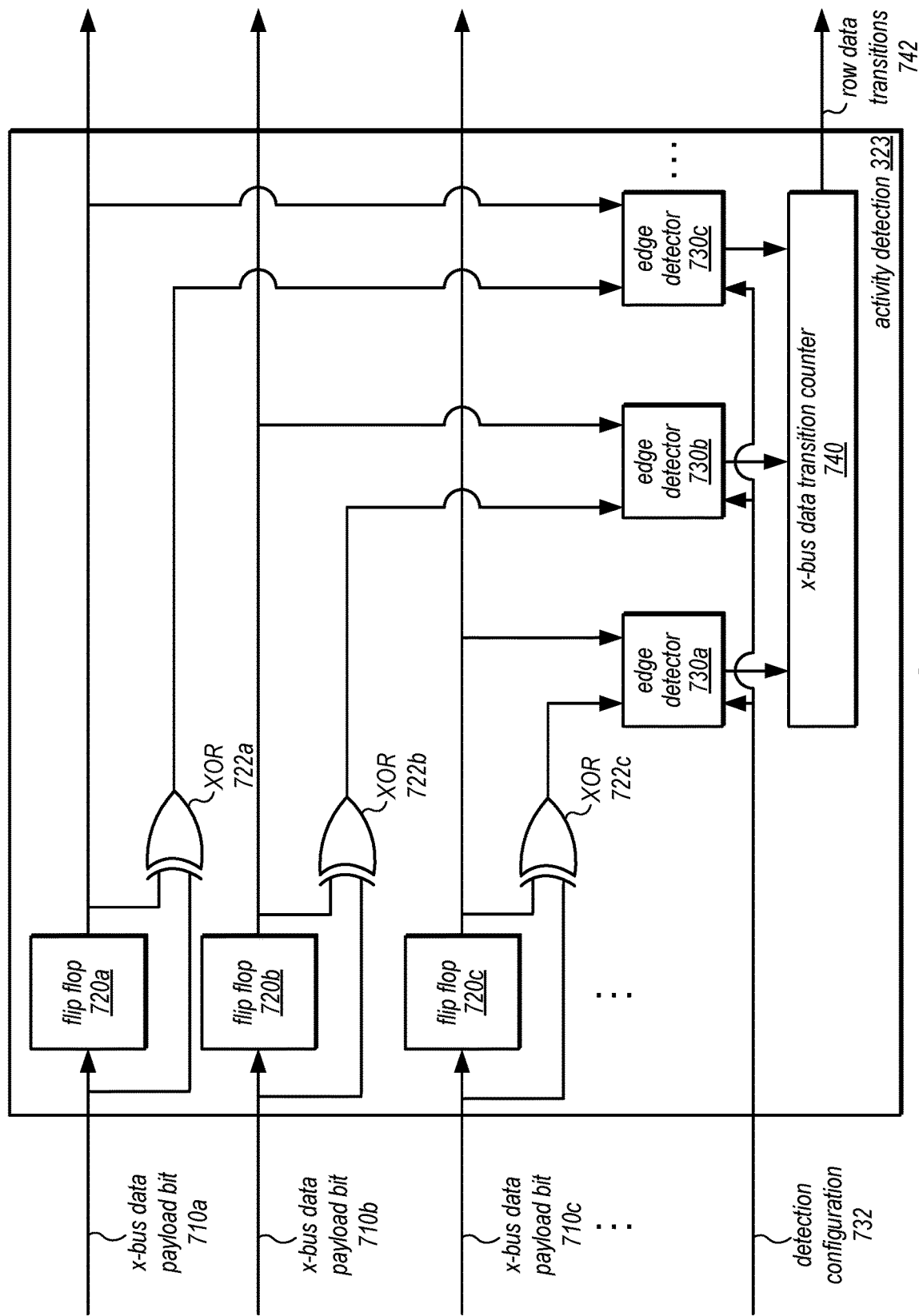
FIG. 7 is a logical block diagram illustrating data activity detection, according to some embodiments.

As discussed above with regard to FIG. 3, row activity monitors 322 may be implemented to analyze activity data on respective rows. FIG. 7 is a logical block diagram illustrating data activity detection, according to some embodiments. Activity detection 323 may be implemented to monitor changes to input data on a row, in various embodiments. For example, individual bits of a data payload received on an x-direction bus, such as x-bus data payload bit 710a, 710b, 710c, and so on, may be processed through respective flip flops 720a, 720b, 720c and XORs 722a, 722b, and 722c to determine if a data is changing. In this way, a prior x-bus data bit (as output by a flip flop 720) may be XOR'd with a current x-bus data payload bit to determine if the data is changing. In this way, flip flops 720 and XORs 722 may act as a pipeline stage in the x-direction bus path into the array. In some embodiments, data activity monitoring may look at data payload without looking at x-direction control bits (which may not change that much). In some embodiments, the data XORing at 722 may be done on the left edge of the systolic array for the payload bits of each x-direction bus (such as in the preprocessing logic). For 5 x-direction buses, for example, there will be 5 x-direction buses multiplied by 22 payload bits=110 XOR gates per row.

The type of change (e.g., between "0" and "1") may be indicative of the current draw, in some embodiments. A count of the number x-direction bus payload bits that transition in the same direction may be indicative of current draw (e.g., the worst current draw), in some embodiments. While it might be expected that the largest current draw may occur when more bits flip from low-to-high and the largest current sink when more bits flip from high to low. Therefore, it may be beneficial to be able to configure the edge detector 730 to count specific data transitions (as opposed to all data transitions), in some embodiments. In this way, it may be possible to count high-to-low transitions, low-to-high transitions, or a transition in either direction. Which transitions are detected may be configured, as indicated at 732, in some embodiments, via CSRs 340, as discussed above with regard to FIG. 5.

As illustrated in FIG. 7, edge detectors, such as edge detectors 730a, 730b, and 730c may be able to determine the type of changes, as discussed above. For example, edge detectors 730 may take as input the XOR 722 output and current state form flip flop 720 to determine the type of transition. In some embodiments, an edge detector may use a register stage according to the timing of x-direction bus in. Below is example table of mapping respective inputs to edge detector 730 outputs.

TABLE 2

| Edge Detector Inputs | | | Edge Detector Output |
|---|---|---|---|
| Edge Config | Current x-bus bit state | Data XOR output | |
| Rising | 0 | 1 | 1 |
| Rising | 1 | 1 | 0 |
| Falling | 0 | 1 | 0 |
| Falling | 1 | 1 | 1 |
| Rising or Falling | 0 | 1 | 1 |
| Rising or Falling | 1 | 1 | 1 |
| X | X | 0 | 0 |

Activity detection 740 may implement x-bus data transition counter 740, in some embodiments, which may count the edge detector 730 outputs, which indicate the number of x-direction bits that are transitioning, as indicated at 742. In some embodiments, the aggregation of edge detector 730 outputs can be grouped in various ways in order to meet timing.

Figure 8:
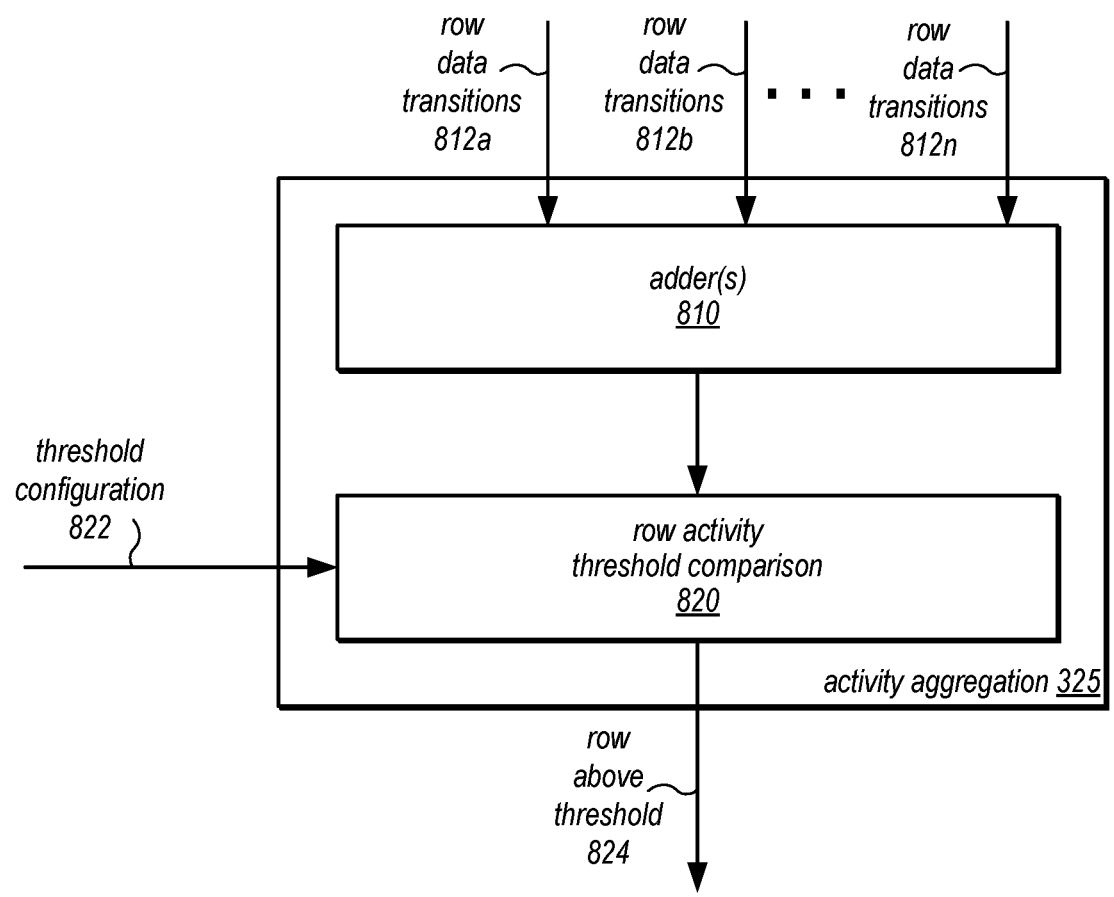
FIG. 8 is a logical block diagram illustrating an example of data activity aggregation, according to some embodiments.

FIG. 8 is a logical block diagram illustrating an example of data activity aggregation, according to some embodiments. As illustrated in FIG. 8, row data transitions from different x-buses for a row, such as row data transitions 812a, 812b, through 812n, may then be combined (e.g., through one or more adder(s) 810, which may be arranged in an adder tree). The combined transitions may then be compared with row against a row activity threshold, as indicated at 820. For example, the combined count may be compared against a programmable row activity threshold, as indicated at 822 and discussed above with regard to FIG. 5, and a single "Row Above Threshold" signal may be output, as indicated at 824, to indicate if the number of transitions is above or below the threshold on each cycle, in some embodiments. The row activity threshold can be configured for all rows based on a single CSR 340, in some embodiments. In some embodiments, the row activity threshold may correspond to match a number of x-direction bus payload bits.

For example, it may be the case that 50% of the bits transitioning or 25% of the bits transitioning (sometimes described as "toggling") in the same direction (which may happen with random data) and may be considered "normal." The Row Activity Threshold may be set to be at these levels such that it could be expected that half the rows being above this threshold is normal. In some embodiments, multiple thresholds may be implemented to indicate different levels of activity by comparing the combined data transitions count with the different levels.

Figure 9:
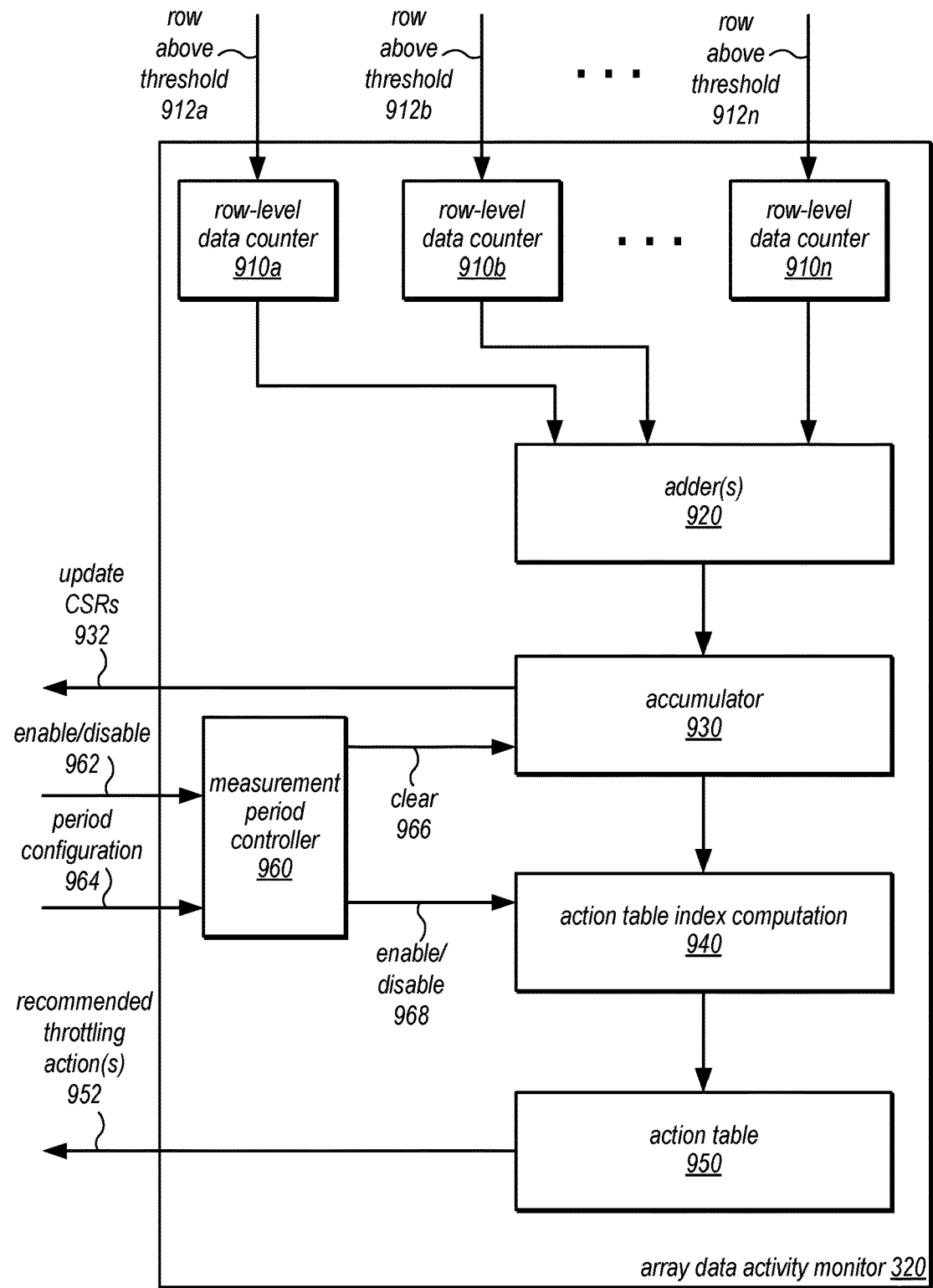
FIG. 9 is a logical block diagram illustrating an example array data activity monitor, according to some embodiments.

FIG. 9 is a logical block diagram illustrating an example array data activity monitor, according to some embodiments. In various embodiments, the individual row above threshold indications, as indicated 912a, 912b, through 912n may be counted at respective row-level counters 910a, 910b, through 910n. One or more adders 920 may be used to combine the individual row-level counts into a single array level count, in some embodiments.

In some embodiments, array data activity may be determined by adding the single array level count to an accumulator, such as accumulator 930, for every cycle. In some embodiments, array data activity may be a measurement over a period of time. As indicated at 932, a current accumulation (or an accumulation as the array data activity measurement upon which a throttling recommendation is made) may be reported back by updating CSRs 340, as indicated at 932.

As noted above, in some embodiments, array data activity may be measured over a period of time. Array data activity monitor 320 may implement measurement period controller 960 in order to implement a measurement time period. For example, configuration information (e.g., which may be obtained or programmed through CSRs 340) may allow for monitoring as a whole to be enabled or disabled, as indicated at 962 and a period of time to be set, as indicated at period configuration 964. Measurement controller 960 may clear accumulator 930 when a measurement period is complete and may enable or disable action table lookups to enable or disable recommending throttling action(s) 952. In at least some embodiments, the measurement period may be programmable and support measurement time periods on the order of seconds (e.g., a 33-bit counter to allow 233/2.8 GHz may equal 3 seconds) and with cycle counts to be powers of 2.

In various embodiments, array data activity monitor 320 may utilize an action table, such as action table 950, to determine throttling recommendations and/or other actions based on the data activity measurements. In some embodiments, action table 950 can be programmed via CSRs 340, as discussed above with regard to FIG. 5. When active, array data activity monitor 320 may perform a lookup into action table 950 at the end of a measurement time period. As indicated at 940, an action table index computation may be performed in order to determine the corresponding entry in the action table to use for the throttling recommendation or other actions. In some embodiments, the index into the table may be broken into two fields. Similar to the discussion above with regard to FIG. 6, one field may be a single bit that indicates a comparison of whether the previous data activity accumulator total was higher or lower than the current data activity accumulator total (to indicate whether the data activity is increasing or decreasing to allow for hysteresis in the table by being to set to a value of "1" if increasing), in some embodiments.

In some embodiments, the second field of the index may be created from the current array data activity accumulator total, as determined at 930. For example, the accumulator total may be divided based on the number of entries in action table 950 and based on the cycles in the measurement period to create the index used in action table 950 lookup. Consider that if the measurement period is 32 clock cycles, then the maximum activity count can be from 0 to 4096 (128 rows*32 clocks). If the action table has 8 entries, the array activity counter value can be divided by 512 (e.g., by shifting right by 9 positions).

In some embodiments, action table 950 may include entries that contain k and n values and a numerical representation of the throttling percentage (k/n). In some embodiments, a power management component (e.g., a microcontroller executing firmware) may populate the table with these values (e.g., the hardware will not compute the numerical representation of k/n). In some embodiments, action table 950 may also include a flag to indicate when an interrupt should be generated and sent. In some embodiments, the numerical representation of k/n may be used to arbitrate between the throttling recommendations from multiple monitors (e.g., with the most severe/lowest throttling percentage winning) by arbiter 330. Then, the k and n values from the winning monitor may be used by throttler 275 to control the throttling.

Below is an example of an action table 950. Note that various other input columns and/or output columns may be included in other embodiments. For example, instead of a percentage range, a value determined by right shifting an accumulated operation total may be stored as current utilization.

TABLE 3

| ACTION TABLE INPUTS | | ACTION TABLE OUTPUTS | | | | |
|---|---|---|---|---|---|---|
| Data Activity Increasing | Generated Index from Current Data Activity | k | n | Throttling Percentage | Interrupt | Notification |
| 1 | 1 | 10 | 10 | 100 | 0 | 0 |
| 1 | 2 | 10 | 10 | 100 | 0 | 0 |
| 1 | 3 | 10 | 10 | 100 | 0 | 0 |
| 1 | 4 | 10 | 10 | 100 | 0 | 0 |
| 1 | 5 | 10 | 10 | 100 | 0 | 0 |
| 1 | 6 | 9 | 10 | 90 | 0 | 1 |
| 1 | 7 | 3 | 4 | 75 | 1 | 0 |
| 1 | 8 | 1 | 2 | 50 | 1 | 1 |
| 0 | 1 | 10 | 10 | 100 | 0 | 0 |
| 0 | 2 | 10 | 10 | 100 | 0 | 0 |
| 0 | 3 | 10 | 10 | 100 | 0 | 0 |
| 0 | 4 | 10 | 10 | 100 | 0 | 0 |
| 0 | 5 | 10 | 10 | 100 | 0 | 1 |

TABLE 3-continued

| ACTION TABLE INPUTS | | | | ACTION TABLE OUTPUTS | | |
|---|---|---|---|---|---|---|
| Data Activity Increasing | Generated Index from Current Data Activity | k | n | Throttling Percentage | Interrupt | Notification |
| 0 | 6 | 9 | 10 | 90 | 0 | 0 |
| 0 | 7 | 3 | 4 | 75 | 0 | 0 |
| 0 | 8 | 1 | 2 | 50 | 0 | 0 |

In embodiments, action table lookups may be determined based on the difference between a current data activity and a previous data activity to allow for a differential control, such as by determining the difference value (e.g., by subtraction) between the accumulator totals representing the current and previous data activity. In some embodiments, multiple action tables and/or multiple lookups may be implemented to determine multiple throttling recommendations for an array data activity measurement. In addition to throttling percentages, other actions, such as notifications or interrupts may be recommended and sent to an arbiter 330 (via other outbound interfaces, such as an interrupt signal and/or notification signal). In this way, further information can be provided to a power management component (e.g., as indicated in the example table that interrupts are triggered at "high" levels of throttling by the "1" value).

Figure 10:
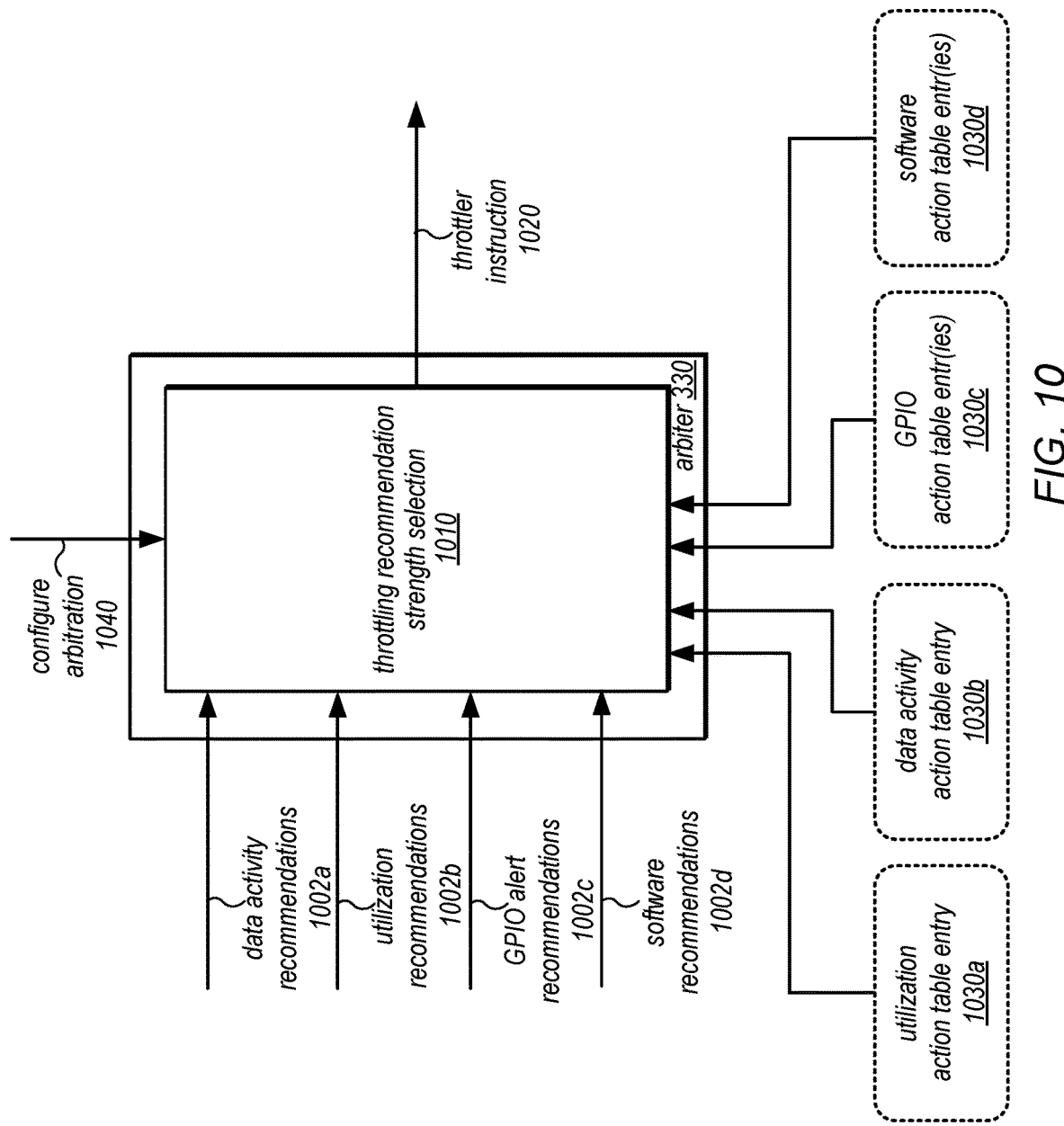
FIG. 10 is a logical block diagram illustrating an arbiter, according to some embodiments.
Figure 11:
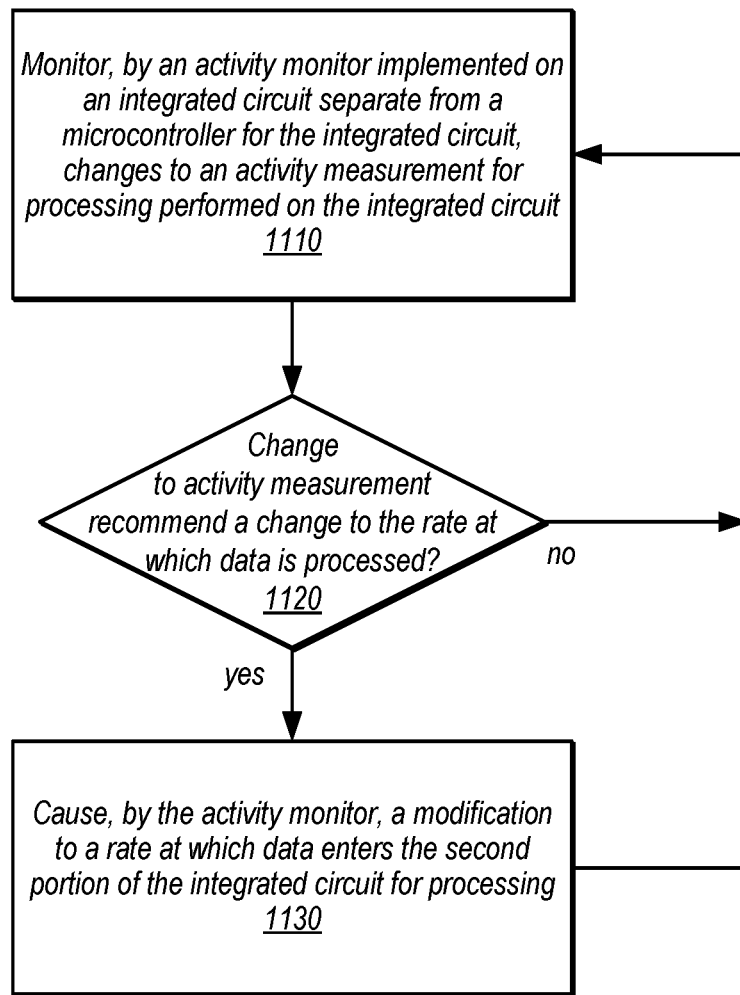
FIG. 11 is a high-level flowchart illustrating various methods and techniques to implement on-circuit activity monitoring for modifying integrated circuit processing, according to some embodiments.

FIG. 10 is a logical block diagram illustrating an arbiter, according to some embodiments. Arbiter 330 may receive throttling recommendations from various sources. For example, data activity recommendations may be received from array data activity monitor 320, in some embodiments, based on array data activity measurements of the changes in input data to the systolic array. The number of data transitions between payload bits received in an x-direction bus may be determined, for instance, and compared with an array activity threshold to indicate those arrays with a higher than expected amount of data activity, resulting in a throttling recommendation.

Similarly, utilization recommendations 1002b may be received that are determined by array utilization monitor(s) 310. Array utilization monitor(s) 310 may measure the number of operations (e.g., matrix multiply operations) in instructions to processing elements (e.g., at various rows) in order to determine respective utilization numbers for different processing cycles.

Some recommendations may not be generated by monitors, but instead from external sources. For example, GPIO alert recommendations 1002c may triggered based on other sensor readings (e.g., with respect to a voltage regulator). In this way, arbiter 330 may support other scenarios where hardware can detect conditions from the sensor readings to bypass software-based power management (e.g., a microcontroller) in order to quickly trigger throttling. Different types of GPIO alert recommendations 1002c may be supported from different sources (e.g., from different sensors or other hardware components that may monitor for specific events). Similarly, CSRs 340 can be used to provide software recommendations 1002d, which may allow power management 212, or other software-based controls to make throttling recommendations to a hardware-based arbiter like arbiter 330.

In at least some embodiments, the amount of throttling (as well as any other responsive actions, including reporting various statistics or information about throttler instruction 1020 via notification channels or interrupts) may be obtained from an action table. An action table may include one or multiple entries that may include, among other information, how much to throttle (e.g., as specified according to k and n values). Various monitors make recommendations obtained from entries in action tables, such as utilization action table entry 1030a and data activity table entry 1030b. In some embodiments, action tables may also provide entries for externally sourced recommendations, so that the throttling recommendations may be pre-defined, such as GPIO action table entry 1030c and software action table entry 1030d.

In various embodiments, an action table can be programmed via CSRs 340, as discussed above with regard to FIG. 5. In various embodiments, in order to be accessed, a lookup into an action table may be performed. An action table index computation may be performed in order to determine the corresponding entry in the action table to use for the throttling recommendation or other actions. In some embodiments, the index into the table may be broken into two fields. One field may be a single bit that indicates a comparison of previous activity measurements (to indicate whether the data activity is increasing or decreasing to allow for hysteresis in the table, as discussed above with regard to FIGS. 6 and 9), in some embodiments. In some embodiments, the second field of the index may be created from the activity measurement itself (e.g., by performing various calculations or operations on the activity measurement).

Below is an example of an action table. Note that various other input columns and/or output columns may be included in other embodiments. For example, instead of a percentage range, a value determined by right shifting an accumulated operation total may be stored as current utilization.

TABLE 4

| ACTION TABLE INPUTS | | | | ACTION TABLE OUTPUTS | | |
|---|---|---|---|---|---|---|
| Data Activity Increasing | Measurement Range | k | n | Throttling Percentage | Interrupt | Notification |
| 1 | 1-10 | 10 | 10 | 100 | 0 | 0 |
| 1 | 10-20 | 10 | 10 | 100 | 0 | 0 |
| 1 | 20-30 | 10 | 10 | 100 | 0 | 0 |
| 1 | 30-40 | 10 | 10 | 100 | 0 | 0 |
| 1 | 40-50 | 10 | 10 | 100 | 0 | 0 |
| 1 | 50-60 | 9 | 10 | 90 | 0 | 1 |
| 1 | 60-70 | 3 | 4 | 75 | 1 | 0 |
| 1 | 70-80 | 1 | 2 | 50 | 1 | 1 |
| 0 | 1-10 | 10 | 10 | 100 | 0 | 0 |
| 0 | 10-20 | 10 | 10 | 100 | 0 | 0 |
| 0 | 20-30 | 10 | 10 | 100 | 0 | 0 |
| 0 | 30-40 | 10 | 10 | 100 | 0 | 0 |
| 0 | 40-50 | 10 | 10 | 100 | 0 | 1 |
| 0 | 50-60 | 9 | 10 | 90 | 0 | 0 |
| 0 | 60-70 | 3 | 4 | 75 | 0 | 0 |
| 0 | 70-80 | 1 | 2 | 50 | 0 | 0 |

In embodiments, action table lookups may be determined based on the difference between a current activity measurement and a previous activity measurement to allow for a differential control, such as by determining the difference value (e.g., by subtraction) between the measurements representing the current and previous activity. In some embodiments, multiple action tables and/or multiple lookups may be implemented to determine multiple throttling recommendations. In addition to throttling percentages, other actions, such as notifications or interrupts may be recommended and sent (via other outbound interfaces, such as an interrupt signal and/or notification signal). In this way, further information can be provided to a power management component (e.g., as indicated in the example table that interrupts are triggered at "high" levels of throttling by the "1" value).

In various embodiments, arbiter 330 may implement one or multiple components to implement throttling recommendation strength selection 1010. Throttling recommendation strength selection 1010 may implement a technique to select from the received recommendations a strongest throttling recommendation to send as instruction 1020. For example, various throttling recommendations may indicate various throttling strengths (e.g., represented as numeric values or percentages as described above with regard to FIG. 5). Throttling recommendation strength selection 1010 may then compare these throttling strengths to identify a highest or lowest value according to the way in which strength is specified. As different recommendations may arrive at different times, selection by throttling recommendations strength selection 1010 may be triggered or performed in response to receiving another throttling recommendation. For example, a measurement period for an activity monitor may end, causing a new throttling recommendation to be made to arbiter 330. In some scenarios, the throttling recommendation made by a source may not change, but the evaluation may still be performed.

As indicated at 1040, arbiter 330 may support changes in configuration (e.g., received via CSRs 340). For example, arbitration configuration 1040 may mask or exclude some recommendation sources from consideration (e.g., from one or more utilization monitors, data activity monitors, etc.), even if those sources may recommend the strongest throttling.

The examples of a various monitoring techniques discussed above have been given in regard to an example machine learning accelerator. Note that various other types or configurations of integrated circuits may implement the above techniques. In addition to examples given above, the techniques discussed below with regard to FIGS. 11-19 may be also implemented using the various components discussed above as well as different types of systems or devices that implement an integrated circuit.

Figure 1B:
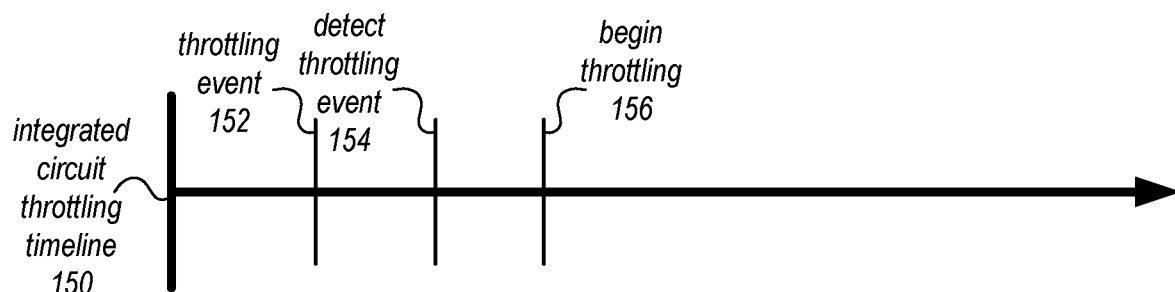
FIGS. 1B-1C illustrate example timelines for detecting throttling events, according to some embodiments.
Figure 1C:
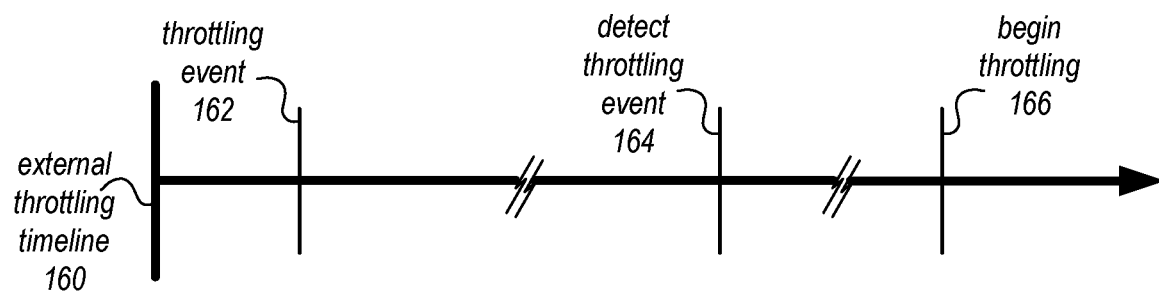

As indicated at 1110, an activity monitor may be implemented on an integrated circuit, in various embodiments. For example, an activity monitor may be implemented close to input stages or elements of a processing component implemented on a second portion of the integrated circuit, like activity monitor 290 located near x-direction bus inputs to systolic array 273 as discussed above with regard to FIG. 3. In various embodiments, the activity monitor may monitor changes to an activity measurement for processing performed on the integrated circuit. For example, as discussed above with regard to FIGS. 1 and 3, different types of activity measurements related to input data activity (e.g., often does the input data toggle) or utilization (e.g., how many and/or what kinds of operations are performed, like a number of matrix multiply operations). In various embodiments, monitoring may be continuously performed. In some embodiments monitoring may be selectively enabled or disabled, according to various monitoring or configuration information supplied to the activity monitor (e.g., via CSRs 340 discussed above with regard to FIGS. 3 and 5).

As indicated at 1120, a determination may be made as to whether a change to activity measurement recommends a change to the rate at which data is processed, in some embodiments. For example, various thresholds, criteria, or other analysis comparing one measurement to another (e.g., a prior measurement to a current measurement) may be considered to determine whether or not throttling is recommended. In some embodiments, an action table or other mapping information may be maintained that can lookup whether an observed change recommends throttling. Throttling recommendations may also recommend an amount of throttling, in some embodiments. For example, a throttling percentage as discussed above with regard to FIG. 4 may be specified. In some embodiments, throttling may proceed in step-wise fashion, where each change that recommends throttling may cause an increase throttling according to a default amount and where each change that does not recommend throttling may cause a decrease in throttling according to a default amount.

Monitoring may continue (unless disabled) as indicated by the negative exit from 1120 if a change does not recommend a change to the rate at which data is processed. If a change to the rate is recommended, then, as indicated at 1130, a modification to the rate at which data enters the second portion of the integrated circuit for processing may be changed by the activity monitor, in various embodiments. For example, a throttling component, such as throttler 275 may be instructed to throttle. In some embodiments, the instruction to throttle may include how much to throttle. A change may be an increase in throttling up to a full throttle where data does not enter for processing. A change may be a decrease in throttling up to no throttling applied at all. Although not illustrated, as discussed above with regard to FIGS. 3 and 5, external components, such as power management 212 may also cause modifications to the rate at which data enters the second portion of the integrated circuit for processing (e.g., via alerts or other interfaces, such as through writes to CSRs 340), in some embodiments.

Figure 12:
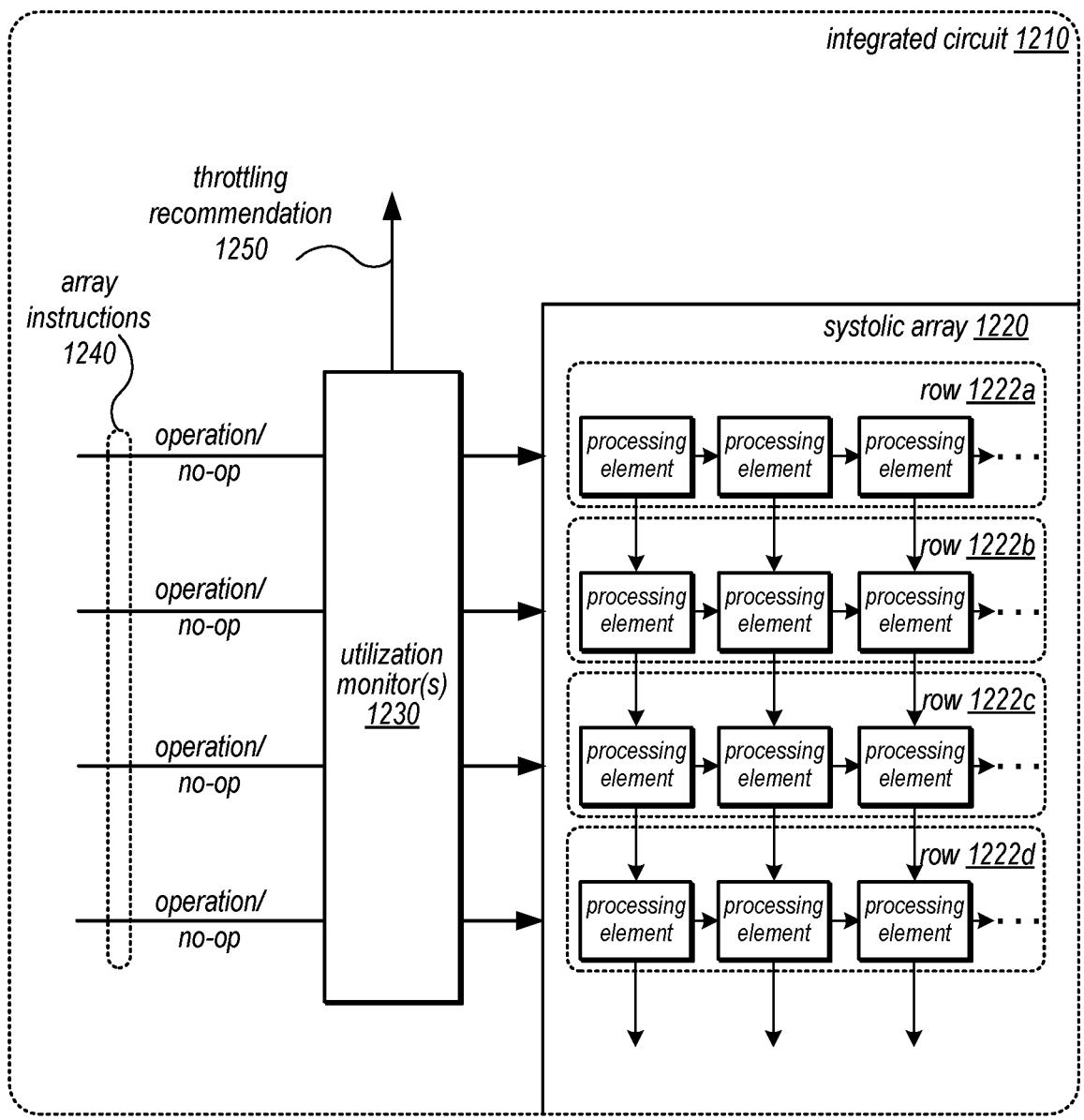
FIG. 12 illustrates a logical block diagram illustrating on-circuit utilization monitoring for a systolic array, according to some embodiments.

In various embodiments, different types of on-circuit monitoring may be implemented. FIG. 12 illustrates a logical block diagram illustrating on-circuit utilization monitoring for a systolic array, according to some embodiments. Integrated circuit 1210 may be an application specific integrated circuit (ASIC), field programmable gate array (FPGA), system-on-a-chip (SoC), or any other dedicated circuitry that performs processing for various tasks. Integrated circuit 1210 may implement a systolic array 1220, which may perform various processing tasks (e.g., training and/or inference tasks for machine learning models using a systolic array as discussed above with regard to FIGS. 2-10). Systolic array 1220 may implement various processing elements organized in rows, such as 1222*a*, 1222*b*, 1222*c*, 1222*d*, and so on, which also process data in a second direction down respective columns.

As illustrated in FIG. 12, utilization monitoring may be implemented on integrated circuit 1210, such as by utilization monitor 1230. Utilization monitor(s) 1230 may determine a measurement of the utilization of processing elements of systolic array 1220 (e.g., an actual or estimated use), in various embodiments, according to array instructions 1240. Array instructions 1240 may include operations to perform at a processing element or no-operation (no-op) to perform at that processing element on that row in a given cycle to which the array instructions 1240 apply, in some embodiments. For example, matrix multiply operations for performing machine learning tasks, as discussed above with regard to FIG. 6, may be performed at processing elements, included as part of array instructions, and measured by utilization monitor(s) 1230, as discussed above with regard to FIG. 6. In some embodiments, multiple utilization monitor(s) 1230 may be implemented to determine utilization measurements for different measurement time periods, which may be programmatically set.

Utilization monitor(s) 1230 may provide a throttling recommendation 1250, which may indicate whether to throttle (and, in some embodiments, how much throttle), as discussed above with regard to FIG. 6. Throttling recommendation 1250 may be provided to an on-circuit component, such as a microcontroller or, as in FIGS. 3 and 10, an on-circuit arbiter that handles throttling recommendations from multiple monitors as part of a larger activity monitor. In some embodiments, throttling recommendation 1250 may be provided to an external (e.g., off-circuit or off-chip) microcontroller.

Figure 13:
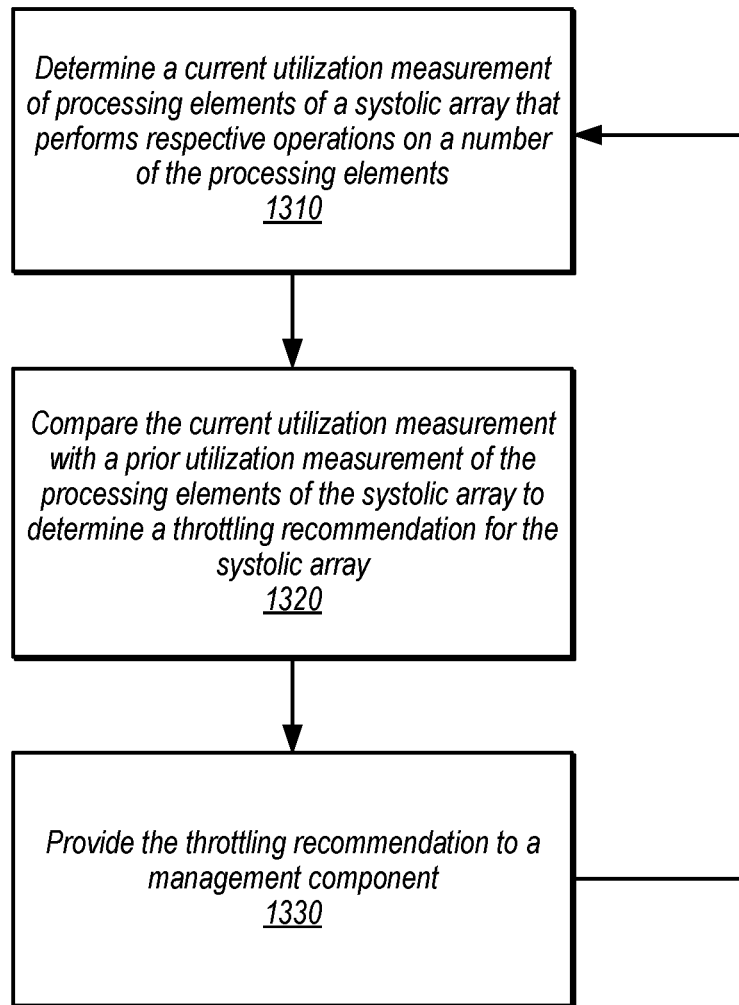
FIG. 13 is a high-level flowchart illustrating various methods and techniques to implement on-circuit utilization monitoring for a systolic array, according to some embodiments.

FIG. 13 is a high-level flowchart illustrating various methods and techniques to implement on-circuit utilization monitoring for a systolic array, according to some embodiments. As indicated at 1310, a current utilization measurement of processing elements of a systolic array that performs respective operations on a number of the processing elements may be determined by a utilization monitor, in some embodiments. For example, as discussed above with regard to FIGS. 1 and 6, and below with regard to FIG. 14, different ways of calculating the utilization may be implemented. In some embodiments, the operations performed across all processing elements in each column may be captured and counted (e.g., by circuitry that indicates the whether an operation or no-op) was performed by the processing elements). In some embodiments, as discussed below with regard to FIG. 14, a subset of columns of processing elements (e.g., a subset of one column, the first column), may be used to determine the number of processing elements which may then be multiplied by the number of other columns in the systolic array (e.g., 6 operations performed on 6 different rows in an input column may be multiplied by 128 columns to be 768 operations for that cycle).

As indicated at 1320, the current utilization measurement may be compared with a prior utilization measurement of the processing elements of the systolic array to determine a throttling recommendation for the systolic array. For example, a prior measurement may be stored in a register or other storage component and then compared with the current utilization measurement. In some embodiments, the comparison may be used to determine part of an action table lookup, as discussed above with regard to FIG. 6 and below with regard to FIG. 14. The comparison may indicate whether throttling should change, increase, or decrease by maintaining, lowering, or raising the rate at which data is input into the systolic array.

As indicated at 1330, the throttling recommendation may be provided to a management component, in some embodiments. For example, an arbiter, as discussed above with regard to FIG. 3, may determine whether to perform the throttling recommendation. In some embodiments, a microcontroller, executing power management or other management capacities, implemented on the integrated circuit with the systolic array. In some embodiments, a microcontroller, executing power management or other management capacities, implemented external to the integrated circuit with the systolic array (e.g., on a card or board that implements the integrated circuit).

Figure 14:
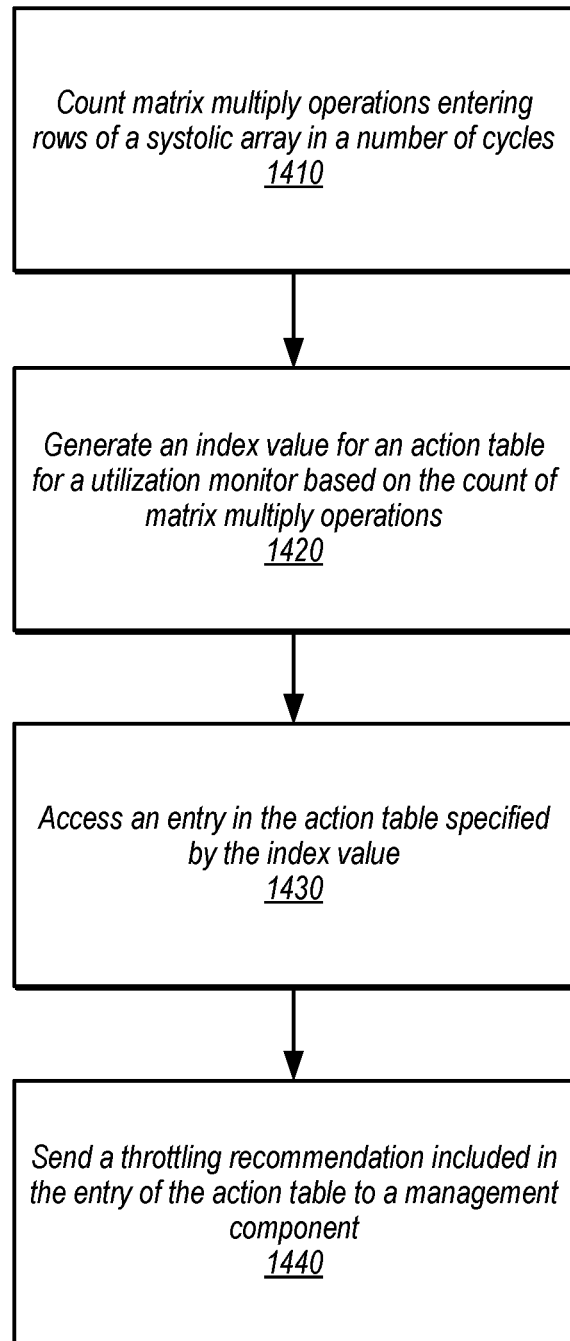
FIG. 14 is a high-level flowchart illustrating various methods and techniques to determine a throttling recommendation from a utilization measurement of a systolic array, according to some embodiments.

FIG. 14 is a high-level flowchart illustrating various methods and techniques to determine a throttling recommendation from a utilization measurement of a systolic array, according to some embodiments. As indicated at 1410, matrix multiply operations entering rows of a systolic array in a number of cycles within a period of time may be counted, in some embodiments. For example, as illustrated in FIG. 6, various row counters, adders, and an accumulator may be used to count the matrix multiply operations. In some embodiments, matrix multiply operations performed in a systolic array may be counted for each processing element (e.g., across all columns) or for a subset of processing elements (e.g., at a first column). The counting may continue for multiple cycles until the period of time for measurement expires.

As indicated 1420, an index value for an action table for a utilization monitor may be generated based on the count of matrix multiply operations, in some embodiments. For example, the index value may be include one or multiple parts, which may be determined from the count. As discussed above, the count may be compared to a prior count to determine an increase bit (or other indicator). As discussed above, the count may be divided by the total number of processing elements multiplied by the number of cycles in the time period to determine a percentage value as the index. In some embodiments, a shift operation may be performed to determine the index values (e.g., by shifting right to reduce the count to a number of bits representing a number of possible entries in an index table).

As indicated at 1430, an entry in the action table specified by the index value may be accessed, in some embodiments. As indicated at 1440, a throttling recommendation included in the entry of the action table to a management component may be sent, in some embodiments. For example, a throttling percentage and/or other actions may be included in the entry identified by the index value. Notifications and/or interrupts may also be sent, as indicated in the entry, in some embodiments.

Different types of activity monitoring may be able to detect different types of problematic power conditions, as discussed above with regard to FIG. 1. For example, specific data patterns can increase power usage in a systolic array (e.g., by more than 2×). High power usage from data activity may be caused by a large number of processing elements switching in the systolic array. The high power from the large numbers of processing elements switching may be due to the sequence of data patterns being input into the systolic array (e.g., via an x-direction bus) or may be due to a sequence of data passing through multiply and accumulate operations performed by the processing elements. As noted above, malicious actors intentionally trying to create a power-virus to bring down a system utilizing a systolic array could to try to cause high data activity on x-direction buses through which data is input into the systolic array since the data on x-direction buses is easy for a malicious actor to control (e.g., by the input data provided) and since it is extremely difficult to manipulate operations in a systolic array on a y-bus (even when knowing the logic equations in the multiplier and accumulator) to formulate sequential data patterns to feed into a systolic array to make all the processing elements simultaneously hit calculations that cause particularly high amount of switching. Additionally, since the x-direction buses carry the same data across the array, it is much less expensive (in terms of the logic required and the design complexity) to detect high x-direction bus data activity switching. Therefore, in at least some embodiments, data activity monitoring may monitor x-direction bus switching (e.g., for ifmaps and for weights) and triggering throttling as necessary to control power.

Figure 15:
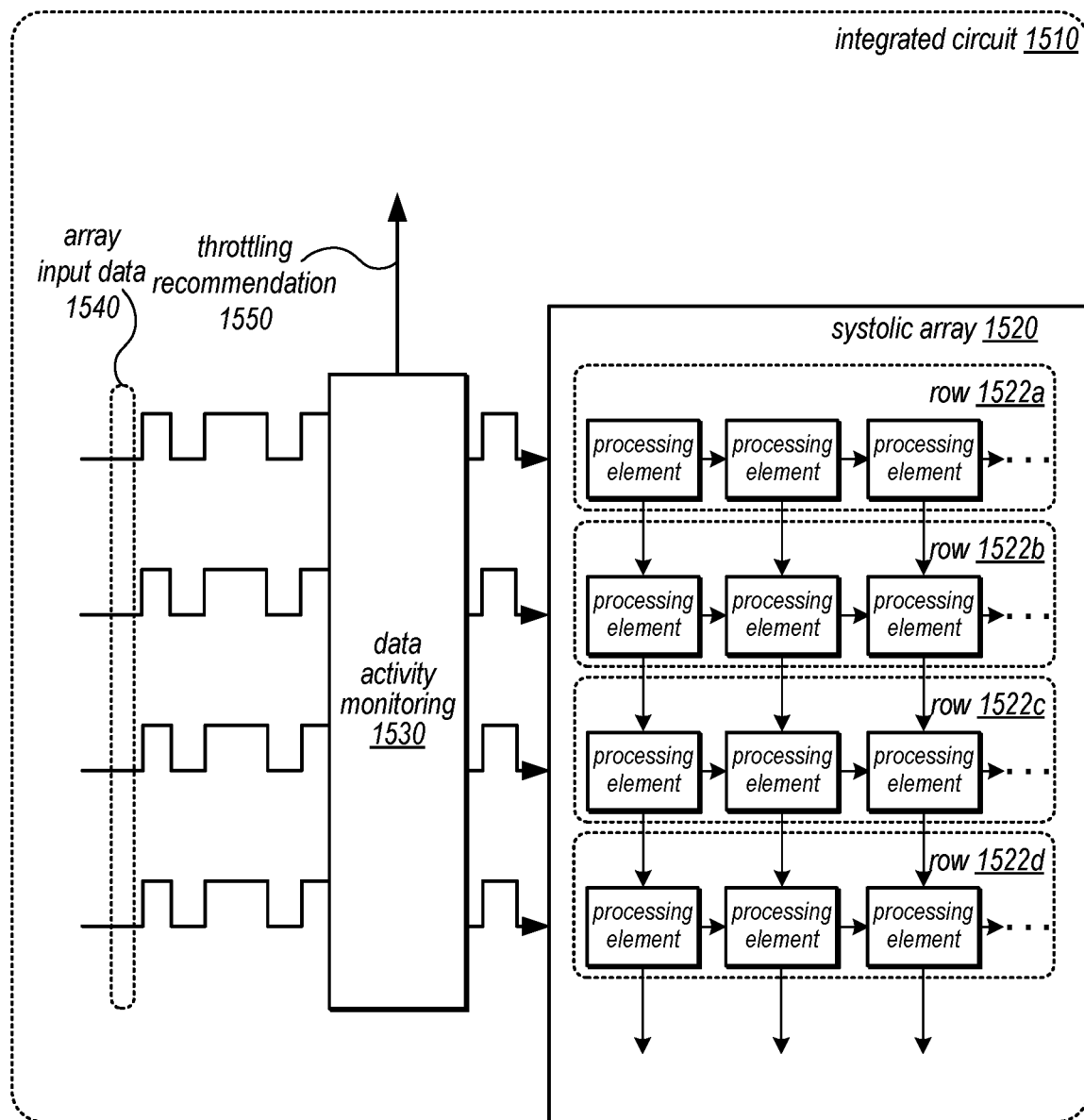
FIG. 15 illustrates a logical block diagram illustrating on-circuit data activity monitoring for a systolic array, according to some embodiments.

FIG. 15 illustrates a logical block diagram illustrating on-circuit data activity monitoring for a systolic array, according to some embodiments. Integrated circuit 1510 may be an application specific integrated circuit (ASIC), field programmable gate array (FPGA), system-on-a-chip (SoC), or any other dedicated circuitry that performs processing for various tasks. Integrated circuit 1510 may implement a systolic array 1520, which may perform various processing tasks (e.g., training and/or inference tasks for machine learning models using a systolic array as discussed below with regard to FIGS. 2-10). Systolic array 1520 may implement various processing elements organized in rows, such as 1522a, 1522b, 1522c, 1522d, and so on, which also process data in a second direction down respective columns.

As illustrated in FIG. 15, data activity monitoring may be implemented in integrated circuit 1510, such as by data activity monitoring 1530. Data activity monitoring 1530 may determine a measurement of the data activity according to changes in array input data 1540, in various embodiments. For example, detecting edges (e.g., data toggles or other transitions between value "0" and value "1") in array input data 1540 for performing machine learning tasks, as discussed above with regard to FIGS. 2-10, may be measured by data activity monitoring 1530, as discussed in detail below. In some embodiments, various techniques for aggregating or interpreting changes to array input data 1540, such as counting rows with activity above one or more thresholds, as discussed below with regard to 7.

Array data activity monitoring 1530 may provide a throttling recommendation 1550, which may indicate whether to throttle (and, in some embodiments, how much to throttle), as discussed below with regard to FIG. 16. Throttling recommendation 1550 may be provided to an on-circuit component, such as a microcontroller or, as in FIGS. 3 and 10, an on-circuit arbiter that handles throttling recommendations from multiple monitors as part of a larger activity monitor. In some embodiments, throttling recommendation 1550 may be provided to an external (e.g., off-circuit or off-chip) microcontroller.

Figure 16:
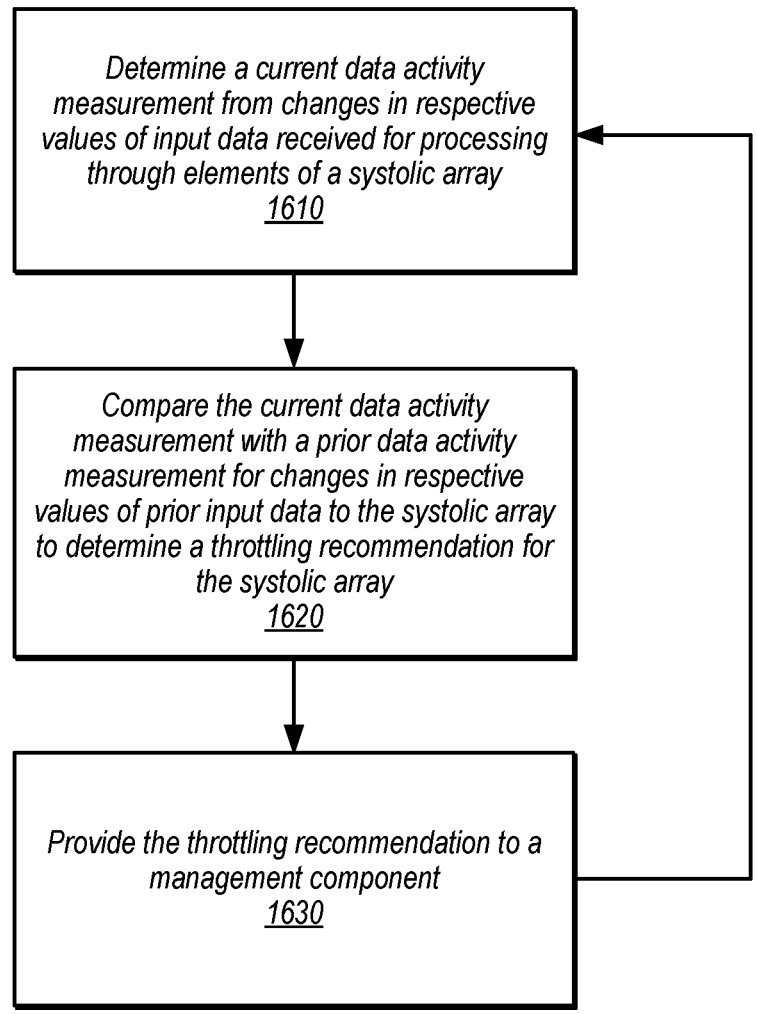
FIG. 16 is a high-level flowchart illustrating various methods and techniques to implement on-circuit data activity monitoring for a systolic array, according to some embodiments.

FIG. 16 is a high-level flowchart illustrating various methods and techniques to implement on-circuit utilization monitoring for a systolic array, according to some embodiments. As indicated at 1610, a current data activity measurement of changes in respective values of input data to processing elements of a systolic array, in some embodiments. For example, as discussed above with regard to FIGS. 1 and 7-9, different ways of calculating the current data activity may be implemented according to the transitions between bits of payload data (e.g., toggling of bit values between "0" and "1"). In some embodiments, the data transitions performed across all processing elements in each row may be captured and counted (e.g., by circuitry that indicates the data signal transitioned). In some embodiments, data transitions for individual rows may be determined and compared with a threshold, so that the total number of rows above the threshold may be the measurement of data activity.

As indicated at 1620, the current data activity measurement may be compared with a prior data activity measurement of changes in respective values of prior input data to the systolic array to determine a throttling recommendation for the systolic array. For example, a prior measurement may be stored in a register or other storage component and then compared with the current data activity measurement. In some embodiments, the comparison may be used to determine part of an action table lookup, as discussed above with regard to FIG. 7 and below with regard to FIG. 17. The comparison may indicate whether throttling should change, increase, or decrease by maintaining, lowering, or raising the rate at which data is input into the systolic array.

As indicated at 1630, the throttling recommendation may be provided to a management component, in some embodiments. For example, an arbiter, as discussed above with regard to FIG. 3, may determine whether to perform the throttling recommendation. In some embodiments, a microcontroller, executing power management or other management capacities, implemented on the integrated circuit with the systolic array. In some embodiments, a microcontroller, executing power management or other management capacities, implemented external to the integrated circuit with the systolic array (e.g., on a card or board that implements the integrated circuit).

Figure 17:
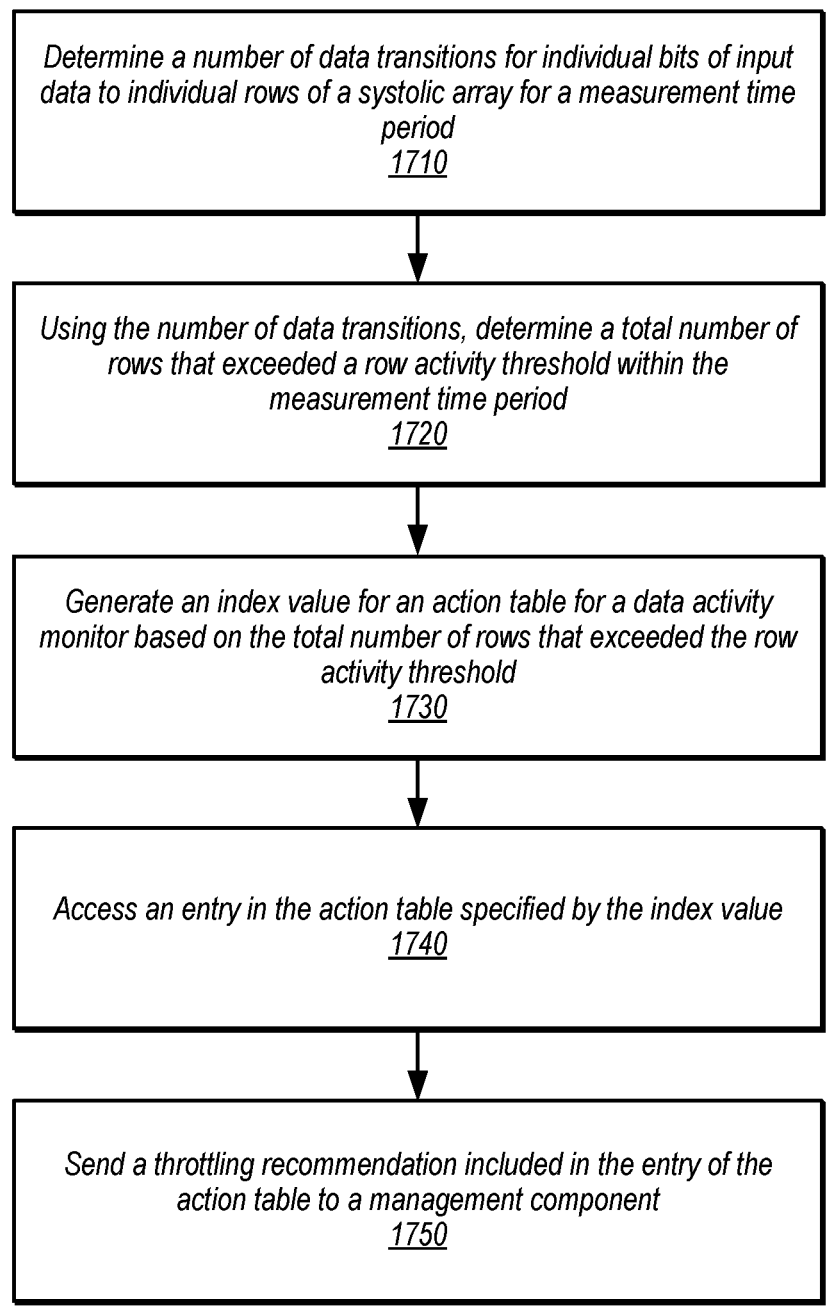
FIG. 17 is a high-level flowchart illustrating various methods and techniques to aggregate row data activity measurements to determine a throttling recommendation for a systolic array, according to some embodiments.

FIG. 17 is a high-level flowchart illustrating various methods and techniques to aggregate row data activity measurements to determine a throttling recommendation for a systolic array, according to some embodiments. As indicated at 1710, a number of data transitions for individual bits of input data to individual rows of a systolic array may be determined for a measurement period, in some embodiments. For example, edge detectors, as discussed above with regard to FIG. 7 may detect transitions based on the output of a register (e.g., flip flop) and an XOR of a current input data bit and the output of the register to determine whether a transition occurred.

As indicated at 1720, the number of data transitions for the individual rows may be used to determine a total number of rows that exceeded a row activity threshold within the measurement time period. For example, while some rows may less frequently (or not at all) have data transitions that exceed a row activity threshold, other rows may have data transitions that frequently exceed the row activity threshold over many cycles. In such scenarios, each occurrence may be included in the total (however infrequent for a particular row) as it may be the case that data activity indicated of problematic conditions may be identified by considered data activity for the systolic array as a whole. Thus, in various embodiments, the total number of rows that exceed the row activity threshold may combine the counts of occurrences for exceeding the row activity threshold for individual rows.

As indicated 1730, an index value for an action table for a data activity monitor may be generated based on the total number of rows that exceeded the row activity threshold, in some embodiments. For example, the index value may be included one or multiple parts, which may be determined from the total. As discussed above, the total may be compared to a prior total for a prior period to determine an increase bit (or other indicator). As discussed above, the total may be used to generate another part of the index value by dividing the total based on the number of entries in action table 950 and based on the cycles in the measurement period. In some embodiments, a shift operation may be performed to determine the index values (e.g., by shifting right to divide the total).

As indicated at 1740, an entry in the action table specified by the index value may be accessed, in some embodiments. As indicated at 1750, a throttling recommendation included in the entry of the action table to a management component may be sent, in some embodiments. For example, a throttling percentage and/or other actions may be included in the entry identified by the index value. Notifications and/or interrupts may also be sent, as indicated in the entry, in some embodiments, which may be used to update statistics collected on systolic array and monitoring performance, be used as input into other management operations, among other uses of interrupts or notification information.

Figure 18:
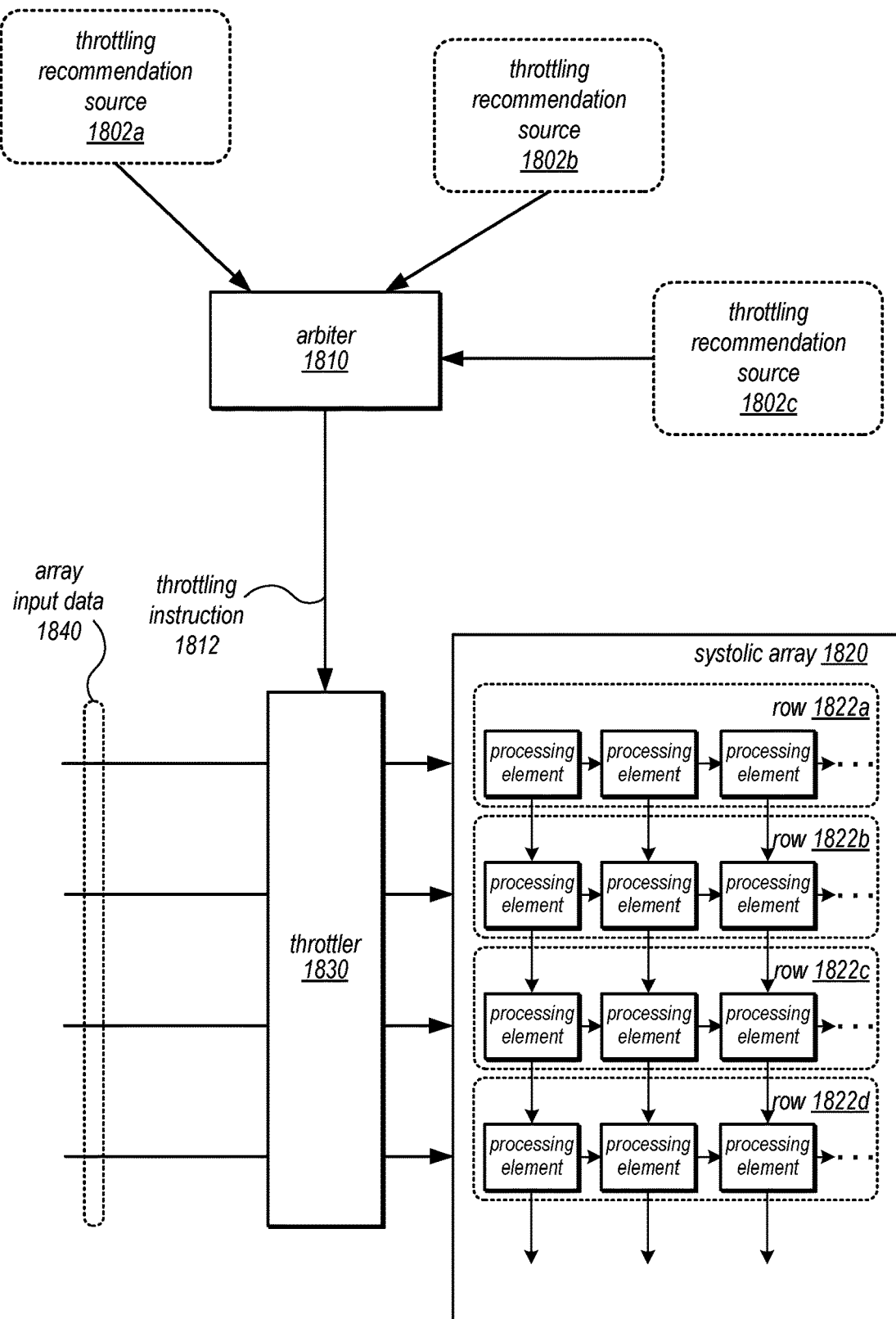
FIG. 18 illustrates a logical block diagram illustrating arbitrating throttling recommendations for a systolic array, according to some embodiments.

FIG. 18 illustrates a logical block diagram illustrating arbitrating throttling recommendations for a systolic array, according to some embodiments. An integrated circuit may be an application specific integrated circuit (ASIC), field programmable gate array (FPGA), system-on-a-chip (SoC), or any other dedicated circuitry that performs processing for various tasks. An integrated circuit may implement a systolic array 1820, which may perform various processing tasks (e.g., training and/or inference tasks for machine learning models using a systolic array as discussed below with regard to FIGS. 2-10) on array input data 1840. Systolic array 1820 may implement various processing elements organized in rows, such as 1822a, 1822b, 1822c, 1822d, and so on, which also process data in a second direction down respective columns.

As illustrated in FIG. 18, throttler 1830 (which may be similar to throttler 275 discussed above with regard to FIG. 4) may be implemented to control the rate at which array input data 1840 is submitted to systolic array 1820 for processing. Throttler 1830 may support varying amounts of throttling, which may be specified according to a throttling instruction 1812 received from arbiter 1810.

In various embodiments, arbiter 1810 may be implemented to handle the various throttling recommendations submitted from different types of throttling recommendation sources, such as sources 1802a, 1802b, and 1802c. For example, as discussed in detail above with regard to FIG. 6, arbiter 1810 may receive throttling recommendations from a hardware-based monitor implemented in the integrated circuit with systolic array 1820. Arbiter 1810 may receive throttling recommendations from various external sources, such as a microcontroller that is evaluating different sensor information, either on-circuit with the systolic array or located elsewhere, in some embodiments. In some embodiments, arbiter 1810 may implement a selection technique, such as throttling strength-based selection, in order to choose how much throttling to instruct, as discussed above with regard to FIG. 10 and below with regard to FIG. 19. Arbiter 1810 may be implemented in hardware, such as on dedicated circuitry in an integrated circuit along with systolic array 1820, as depicted in FIG. 3, or in other embodiments, arbiter 1810 may be implemented in software/firmware at a microcontroller either in the integrated circuit or external to the integrated circuit, in some embodiments.

Figure 19:
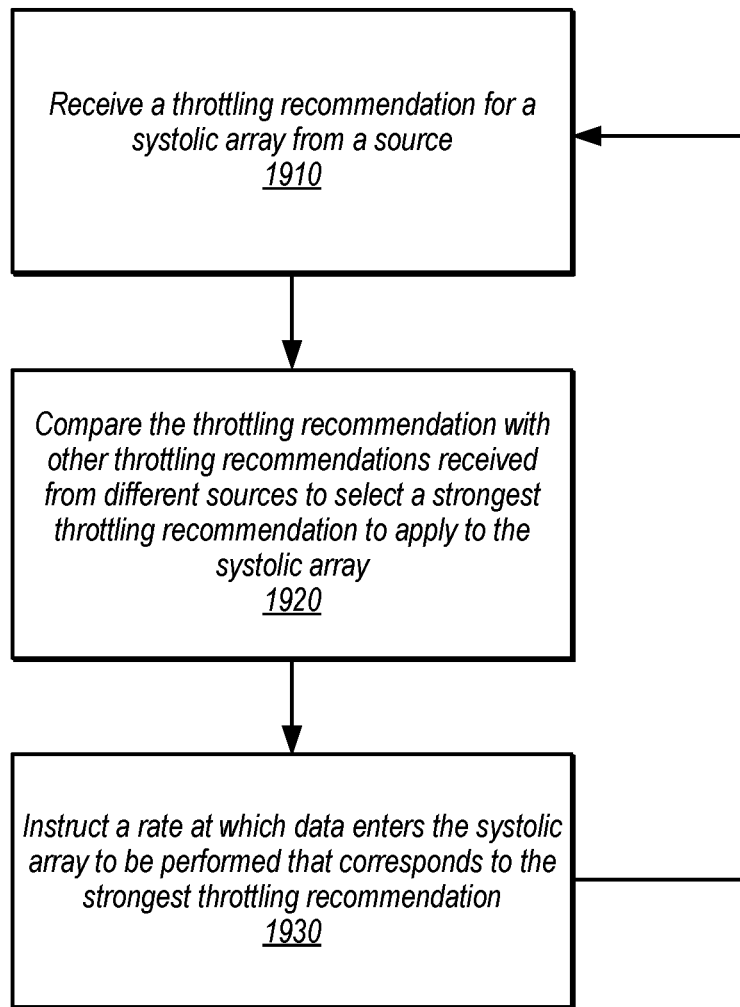
FIG. 19 is a high-level flowchart illustrating various methods and techniques to implement arbitrating for a systolic array, according to some embodiments.

FIG. 19 is a high-level flowchart illustrating various methods and techniques to implement on-circuit utilization monitoring for a systolic array, according to some embodiments. As indicated at 1910, a throttling recommendation for a systolic array may be received from a source, in some embodiments. For example, various different sources may include monitors (e.g., array utilization and/or array data activity) or external sources (e.g., from power management components).

As indicated at 1920, the throttling recommendation may be compared with other throttling recommendations received from different sources to select a strongest throttling recommendation to apply to the systolic array, in some embodiments. For example, different throttling recommendations may be received from different sources at different times (e.g., as different measurement time periods for different monitors may be implemented or different events that trigger external recommendations may occur at different times). As throttling recommendations from a source are received they may be retained until replaced by another recommendation from the same source. Thus, the comparison performed at 1920 may be a comparison between the received throttling recommendations and other throttling recommendations received a various earlier times. In some embodiments, received throttling recommendations may be excluded from consideration according to arbiter configuration information that specifies one (or more) sources to exclude or otherwise mask from throttling.

In some embodiments, strength of throttling may be indicated by a lower amount of data that is allowed to enter the systolic array. For instance, stalling k of n cycles may be numerically represented as k/n. The lowest value of the each received throttling recommendations therefore may be identified as the strongest, in some embodiments.

As indicated at 1930, a rate at which data enters the systolic array may be instructed to be performed that corresponds to the strongest throttling recommendation, in some embodiments. For example, a throttler may be instructed to apply the k of n throttling rate specified in the selected throttling recommendation.

As indicated by the loop back arrow from 1930 to 1910, arbitration may continue indefinitely as throttling recommendations may be replaced when, for example, measurement periods for different monitors are expired (even if the replacement recommendation is the same as the recommendation that is replaced), in some embodiments. In some embodiments, an override instruction may stop arbitration and instead may specify a particular throttling amount to apply, ignoring the throttling recommendations from different sources.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

Embodiments of a host system which may include or interact with a device that implements an integrated circuit that performs processing, such as the machine learning accelerator with a systolic array discussed above, may be implemented as part of a computer system. One such computer system is illustrated by FIG. 20. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 2000 includes one or more processors 2010 coupled to a system memory 2020 via an input/output (I/O) interface 2030. Computer system 2000 may include one or more machine learning accelerators 2090 or other systolic arrays (e.g., similar to processing units and machine learning accelerators discussed above with regard to FIGS. 1-7). These machine learning accelerators 2090 or other systolic arrays may perform operations for various applications, which may include executing neural networks according to instructions generated by neural network compiler 2025 (or another compiler not illustrated), in some embodiments.

Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions, such as program instructions to implement neural network compiler 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    at least one processor;
    a memory, storing program instructions that when executed by the at least one processor cause the at least one processor to submit one or more machine learning tasks for processing to a machine learning accelerator; and
    the machine learning accelerator in an integrated circuit, the machine learning accelerator comprising:
        a systolic array comprising a plurality of processing elements to perform respective operations on a number of the plurality of processing elements to perform one or more machine learning tasks; and
        a data activity monitor, configured to:
            for a first period of time, determine a first data activity measurement of changes in respective values of input data to the systolic array via an x-direction bus;
            for a second period of time, determine a second data activity measurement of changes in respective values of prior input data to the systolic array via the x-direction bus;
            compare the first data activity measurement with the second data activity measurement to determine a throttling recommendation for the systolic array; and
            send the throttling recommendation to a management component for the integrated circuit.

2. The system of claim 1,
    wherein to determine the first data activity measurement of changes in the respective values of the input data received for processing through the plurality of processing elements in the systolic array, the data activity monitor is configured to:
        determine a first number of data transitions for individual bits of the input data to individual rows of the systolic array; and
        determine a total number of rows that exceeded a row activity threshold within the first period of time as the first data activity measurement; and
    wherein to determine the second data activity measurement of changes in the respective values of the prior input data received for processing through the plurality of processing elements in the systolic array, the data activity monitor is configured to:
        determine a second number of data transitions for individual bits of the input data to individual rows of the systolic array; and
        determine a second total number of rows that exceeded the row activity threshold within the second period of time as the second data activity measurement.

3. The system of claim 2, wherein to compare the first data activity measurement with the second data activity measurement to determine the throttling recommendation for the systolic array, the data activity monitor is configured to:
    generate an index value for an action table for the data activity monitor based on the total number of rows that exceeded the row activity threshold and a determination as to whether the second data activity measurement is an increase from the first data activity measurement or a decrease from the first data activity measurement; and
    access an entry in the action table specified by the index value to obtain the throttling recommendation from the entry.

4. The system of claim 1, wherein the data activity monitor is one of a plurality of different monitors implemented within an activity monitor in the integrated circuit that causes the throttling recommendation or another throttling recommendation to be performed by a throttler implemented in the integrated circuit.

5. A method, comprising:
    for a first period of time, determining, by a data activity monitor in a first portion of an integrated circuit, a first data activity measurement from changes in respective values of input data received for processing through a plurality of processing elements in a systolic array, the systolic array in a second portion of the integrated circuit;
    comparing, by the data activity monitor, the first data activity measurement with a second data activity measurement determined from changes in respective values of prior input data received for processing through the plurality of processing elements in the systolic array for a second period of time to determine a throttling recommendation for the systolic array; and
    providing, by the data activity monitor, the throttling recommendation to a management component for the integrated circuit.

6. The method of claim 5, wherein determining the first data activity measurement of changes in the respective values of the input data received for processing through a plurality of processing elements in the systolic array, comprises:
    determining a first number of data transitions for individual bits of the respective values of the input data to individual rows of the systolic array; and
    determining a total number of rows that exceeded a row activity threshold within the first period of time as the first data activity measurement.

7. The method of claim 6, wherein comparing the first data activity measurement of changes in the respective values of the input data with the second data activity measurement of changes in the respective values of prior input data received for processing through the plurality of processing elements in the systolic array for the second period of time to determine the throttling recommendation for the systolic array, comprises:
    generating an index value for an action table for the data activity monitor based on the total number of rows that exceeded the row activity threshold; and
    accessing an entry in the action table specified by the index value to obtain the throttling recommendation from the entry.

8. The method of claim 6, wherein the row activity threshold is configured via a write to a control status register (CSR) implemented in the integrated circuit.

9. The method of claim 6, wherein determining the first number of data transitions for the individual bits of the input data to the individual rows of the systolic array determines the first number of data transitions according to respective types for the data transitions at respective edge detectors.

10. The method of claim 6, further comprising determining a second total number of rows that exceeded a second row activity threshold different than the first row activity threshold within the first period of time as a second data activity measurement.

11. The method of claim 5, wherein the management component is an arbiter implemented in the integrated circuit, wherein the throttling recommendation is one of a plurality of throttling recommendations provided to the arbiter, wherein the arbiter selects one of the plurality of throttling recommendations to perform to throttle a rate at which data enters the systolic array.

12. The method of claim 5, wherein comparing the first data activity measurement with the second data activity measurement, comprises determining a difference value between the first data activity measurement and the second data activity measurement, wherein the difference value is used to identify an entry in an action table for the utilization monitor to make the throttling recommendation.

13. The method of claim 5, wherein the management component is a microcontroller external to the integrated circuit.

14. A device, comprising an integrated circuit, the integrated circuit comprising:
    a systolic array comprising a plurality of processing elements that perform respective operations on a number of the plurality of processing elements during respective cycles; and
    a data activity monitor, configured to:
        for a first period of time, determine a first data activity measurement of changes in respective values of input data to the plurality of processing elements in the systolic array;
        compare the first data activity measurement with a second data activity measurement determined from changes in respective values of prior input data for a second period of time to determine a throttling recommendation for the systolic array; and
        send the throttling recommendation to a management component for the integrated circuit.

15. The device of claim 14, wherein the integrated circuit comprises an arbiter, wherein the arbiter is the management component, and wherein the arbiter is configured to:
    select one of a plurality of throttling recommendations received at the arbiter, including the first throttling recommendation, to instruct to a throttler implemented on the integrated circuit to modify a rate at which data enters the systolic array.

16. The device of claim 14,
    wherein to determine the first data activity measurement of changes in the respective values of the input data received for processing through the plurality of processing elements in the systolic array, the data activity monitor is configured to:
        determine a first number of data transitions for individual bits of the input data to individual rows of the systolic array; and
        determine a total number of rows that exceeded a row activity threshold within the first period of time as the first data activity measurement.

17. The device of claim 16, wherein to compare the first data activity measurement with the second data activity measurement, the data activity monitor is configured to:
    generate an index value for an action table for the data activity monitor based on the first data activity measurement; and
    access an entry in the action table specified by the index value that includes the throttling recommendation.

18. The device of claim 16, wherein the row activity threshold is configured via a write to a control status register (CSR) implemented in the integrated circuit.

19. The device of claim 14, wherein the integrated circuit further comprises a microcontroller, and wherein the microcontroller is the management component provided the throttling recommendation.

20. The device of claim 14, wherein the integrated circuit is an application specific integrated circuit (ASIC), field programmable gate array (FPGA), or system-on-a-chip (SoC).

* * * * *